(12) United States Patent
Hong et al.

(10) Patent No.: US 8,756,524 B2
(45) Date of Patent: Jun. 17, 2014

(54) MANAGEMENT OF DEVICE SETTINGS VIA A PLURALITY OF INTERFACES

(75) Inventors: Yoojin Hong, Redwood City, CA (US); Donald James Lindsay, Waterloo (CA); Dominik Buszko, Sunrise, FL (US); Michael Lee Foster, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 290 days.

(21) Appl. No.: 12/842,590

(22) Filed: Jul. 23, 2010

(65) Prior Publication Data

US 2011/0265028 A1 Oct. 27, 2011

Related U.S. Application Data

(60) Provisional application No. 61/327,442, filed on Apr. 23, 2010.

(51) Int. Cl.
  *G06F 9/46* (2006.01)
  *G06F 3/048* (2013.01)

(52) U.S. Cl.
  USPC .......................................... 715/779; 719/328

(58) Field of Classification Search
  USPC .................... 715/779, 328; 719/328; 345/156
  See application file for complete search history.

(56) References Cited

U.S. PATENT DOCUMENTS

| | | | |
|---|---|---|---|
| 5,745,115 A * | 4/1998 | Purple et al. .................. | 715/810 |
| 6,182,115 B1 * | 1/2001 | Cuomo et al. ................ | 709/204 |
| 6,453,356 B1 * | 9/2002 | Sheard et al. ................. | 709/231 |
| 6,727,917 B1 * | 4/2004 | Chew et al. ................... | 715/765 |
| 7,353,458 B2 * | 4/2008 | Malmstrom ................... | 715/788 |
| 7,512,890 B1 * | 3/2009 | Vogenthaler et al. ......... | 715/744 |
| 2004/0015553 A1 * | 1/2004 | Griffin et al. ................. | 709/206 |
| 2006/0015819 A1 * | 1/2006 | Hawkins et al. .............. | 715/780 |
| 2006/0143622 A1 * | 6/2006 | Prabandham et al. ........ | 719/328 |
| 2008/0168384 A1 * | 7/2008 | Platzer et al. ................. | 715/784 |
| 2009/0249240 A1 * | 10/2009 | Lundy et al. .................. | 715/771 |
| 2010/0185980 A1 * | 7/2010 | Kuo ............................... | 715/810 |
| 2011/0191790 A1 * | 8/2011 | Ba ................................. | 719/328 |

OTHER PUBLICATIONS

Deitel and Deitel, "Java How to Program", Prentice Hall, Inc., 1998, 2nd Edition.*
Android News; "Android: how to add custom title bar;" Mar. 16, 2010; 3 pages; Internet article located at http://oo-androidnews.blogspot.com/2010/03/android-how-to-add-custom-title-bar.html.
Android Developers; "Android Developers Window Class;" Apr. 12, 2010; Internet document located at http://developer.android.com/reference/android/view/Window.html#FEATURE_CUSTOM_TITLE.

* cited by examiner

*Primary Examiner* — William Bashore
*Assistant Examiner* — Jeanette J Parker
(74) *Attorney, Agent, or Firm* — Novak Druce Connolly Bove + Quigg LLP

(57) ABSTRACT

The present specification relates to a portable electronic device comprising at least one processor; a display connected to the processor and controllable by the processor; and non-volatile storage configured to maintain a plurality of applications and an application programming interface for enabling generation and control of a title bar, wherein the application programming interface includes a private part for managing the state of the title bar and a public part that provides an interface to the applications.

17 Claims, 21 Drawing Sheets

MANAGEMENT OF DEVICE SETTINGS VIA A PLURALITY OF INTERFACES

FIELD

The present specification relates generally to computing devices and more specifically relates to a method and apparatus for generating a graphical title bar that can be integrated for use with a plurality of device applications having graphical user interfaces.

BACKGROUND

Mobile electronic devices continue apace to provide greater functionality. Some non-limiting examples are helpful. In terms of applications, email, calendaring, contact management are ubiquitous on mobile electronic devices, and a large number of enhanced applications beyond these core applications are also being offered. In terms of hardware, cameras, high resolution displays, touch screens are also ubiquitous. In terms of network connectivity, devices often include multiple radios to accommodate communication links via different types of core mobile networks (as one non-limiting example, 3G) and wireless local area networks (as one non-limiting example, Institute of Electrical and Electronic Engineers Standard 802.11).

Each application operable on a mobile electronic device may include a user interface for controlling the device display via, for example, a keyboard and pointing device, such as a touch pad or touch screen display. This may be achieved by importing and extending a user interface API for the application. For example, a title bar may be used to display information relating to a plurality of applications and/or the mobile electronic device.

Developers of applications have been known to implement custom title bar components for displaying information relating to respective applications. This can lead to inconsistent presentation of title bar information across multiple applications on a single device. Furthermore, the effort of such developers in designing such customized title bars is duplicated and additional memory and processing resources are required by each application to generate the various icons. Accordingly, a technical problem exists in how to optimize memory usage in a device having multiple applications each requiring display of a title bar. Furthermore, in some instances, developers don't have any control over system notification icon presentations such as battery, signals which can lead to a presentation of information that is not contextual enough for the application.

DETAILED DESCRIPTION OF THE EMBODIMENTS

Figure 1:
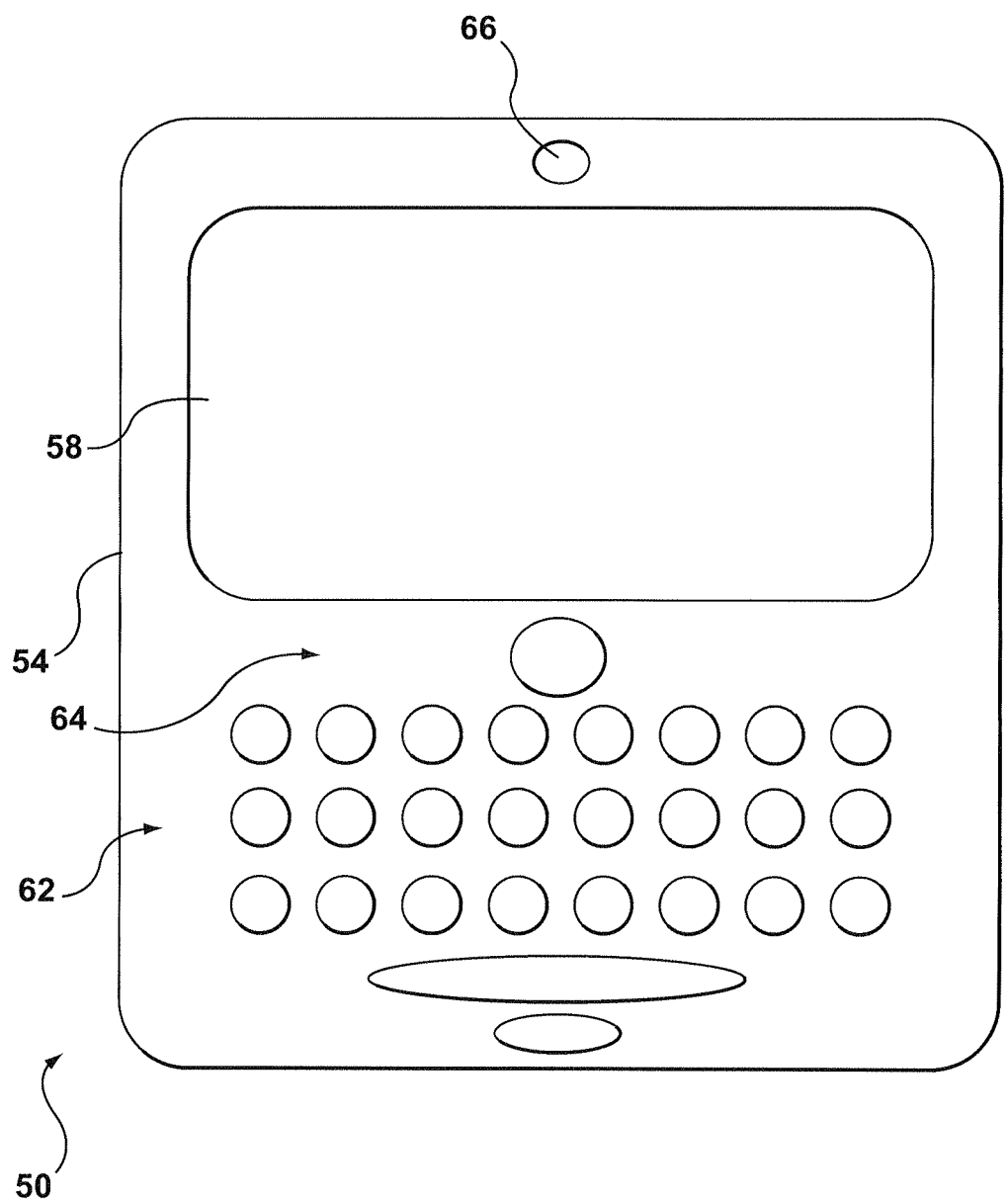
FIG. 1 is a schematic representation of a front view of a portable electronic device according to a non-limiting embodiment.

A first aspect of the specification provides a portable electronic device comprising: at least one processor; a display connected to the at least one processor and controllable by the at least one processor; and non-volatile storage configured to maintain a plurality of applications and an application programming interface that is common to the plurality of applications for enabling the processor to generate and control a title bar under control of the applications, wherein the application programming interface includes a private part for managing the state of the title bar and a public part that provides an interface to the applications.

The title bar can include at least one of current state of information, notifications, pushed icons and signals. The information can include at least one of an application icon, title string and time. The processor can cause the current state of information to be left-aligned on the display and the notifications, pushed icons and signals to be right-aligned on the display.

The application programming interface can include a component for generating one of either a general title of an application or a string that provides information based on the current state of the application.

The application programming interface can include an icon component for generating one of either a general application icon related to an application or an icon that reflects the current state of the application.

The application programming interface can include a clock component for displaying current time.

The public part can include a TitleBar component. The TitleBar component can be a member of a Screen component that provides a set and get functionality for adding and customizing the TitleBar component, whereby any one of the applications that requires display of the title bar extends the TitleBar component in order to avail itself of set and get functionality of the Screen component. The private part can include a TitleBarView class that implements layout for the application programming interface and drawing logic for the title bar, a TitleBarModel class for updating components and that is extended by a StandardTitleBarModel that implements data for defining the current state of the StandardTitleBar object, and a TitleBarController providing interface functionality with the TitleBarModel class and TitleBarView class. The TitleBar component can be extended by a StandardTitleBar component that provides a public interface and provides a plurality of add/remove methods for adding optional components to the title bar. The TitleBar component can have a first package-private method to facilitate adding components to the title bar and a second package-private method to facilitate removing components from the title bar. Each of the first and second package-private method can have a component Key parameter that defines which component to add to the title bar or remove therefrom. The StandardTitleBar component can have at least one optional component containing a pair of functions that are prefixed with "add" and "remove", respectively. The StandardTitleBar component can generate a battery icon in the event that charge on a battery of the portable device falls below a predetermined level or is being charged. The StandardTitleBar component can generate an active phone call indicator in the event a call is in progress on the portable device. The TitleBarController can listen and process events and update the TitleBarModel class and inform the TitleBarView class for redrawing the title bar.

A second aspect of the specification provides a method for controlling a display of a portable device capable of executing a plurality of applications, the method comprising: generating a content region on the display; and generating a title bar on the display divided into a plurality of areas including an information area representing current state of information relating to one of the applications, and an additional area representing at least one of notifications, pushed icons, battery alert, and signals.

The information area can be left aligned relative to the display, whereas the additional area can be right aligned.

The pushed icons can include an active call icon.

The information area can include at least one of a general title of an application or a string that provides information based on the current state of the application, or at least one of a general application icon related to an application or an icon that reflects the current state of the application.

Referring now to FIG. 1, a schematic representation is provided of a non-limiting example of a portable electronic device 50. It is to be understood that portable electronic device 50 is purely exemplary, and it will be apparent to those skilled in the art that a variety of different portable electronic device structures are contemplated. Indeed variations on portable electronic device 50 can include, without limitation, a cellular telephone, a portable email paging device, a camera, a portable music player, a portable video player, a portable video game player. Other contemplated variations include devices which are not necessarily portable, such as desktop computers.

Referring to FIG. 1, device 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. Chassis 54 also supports a keyboard 62. It is to be understood that this specification is not limited to any particular structure, spacing, pitch or shape of keyboard 62, and the depiction in FIG. 1 is purely exemplary. For example, full or reduced "QWERTY" keyboards are contemplated. Other types of keyboards are contemplated. Device 50 also comprises a pointing device 64 which can be implemented as a touch-pad, joystick, trackball, track-wheel, or as a touch sensitive membrane on display 58. Device 50 also comprises a speaker 66 for generating audio output, and a microphone 68 for receiving audio input.

Figure 2:
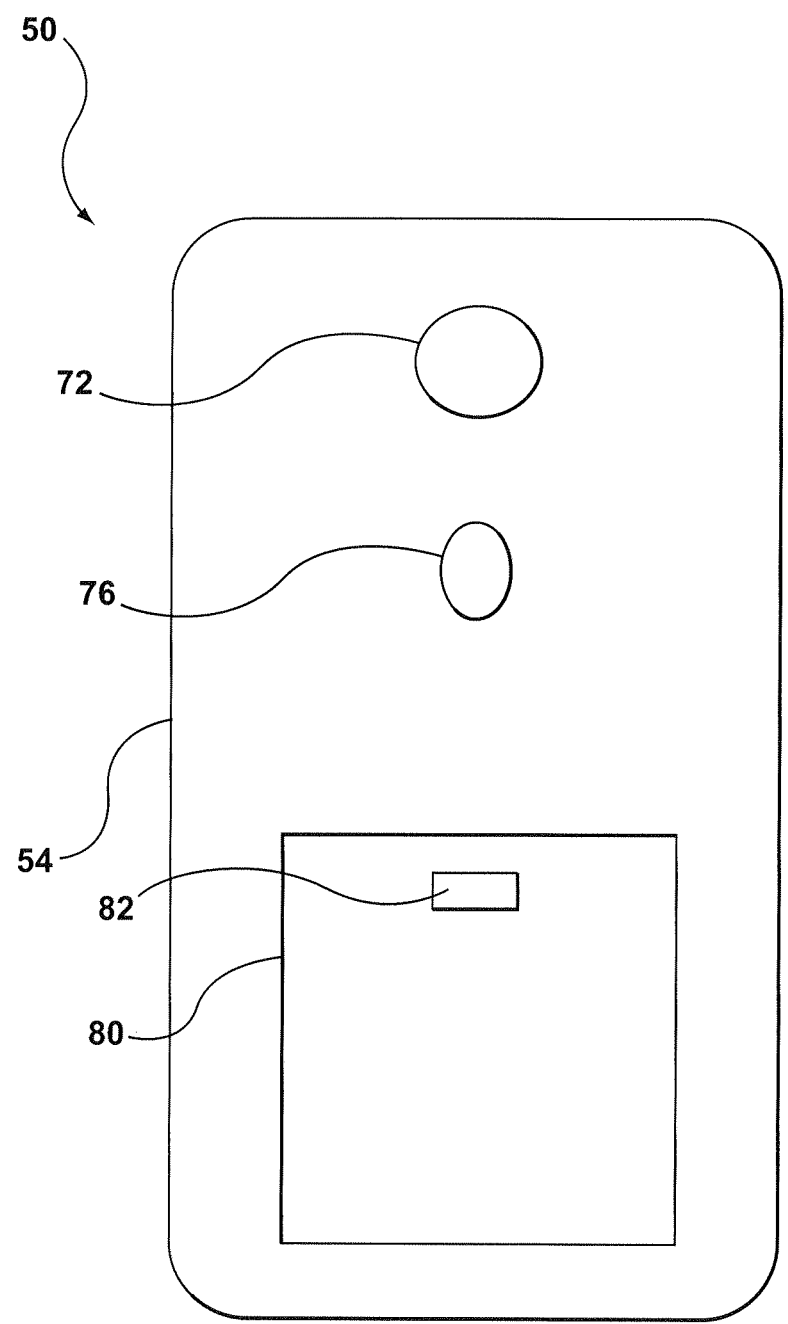
FIG. 2 is a schematic representation of a rear view of a portable electronic device according to a non-limiting embodiment.

Referring to FIG. 2, a rear view of device 50 is shown. In FIG. 2, device 50 is also shown as comprising a flash 72 and an optical capture unit 76. It is to be understood that the term "optical" as used in relation to optical capture unit 76 is not directed to a lens structure or the like, but rather to refer to an array of charge couple devices (CCD) (or a functionally equivalent transducer structure) that is configured, in association with a lens structure, to receive an image in the form of electro-magnetic energy substantially within the visible spectrum, and to convert that energy into an electronic signal which can be further processed. Typically, the electronic signal is digitized for storage. The stored digitized image can be further processed and can be generated on display 58. Flash 72 can activate to provide additional lighting to assist the capture of energy by optical capture 76. In general, it will now be understood that optical capture unit 76 can, if desired, be implemented, or based on, a digital camera function as commonly incorporated into portable electronic devices. A battery compartment cover 80 is also shown in FIG. 2, with a tab 82 that can be manipulated to unlock cover 80 from chassis 54 and so that cover 80 can be detached from chassis 54.

Figure 3:
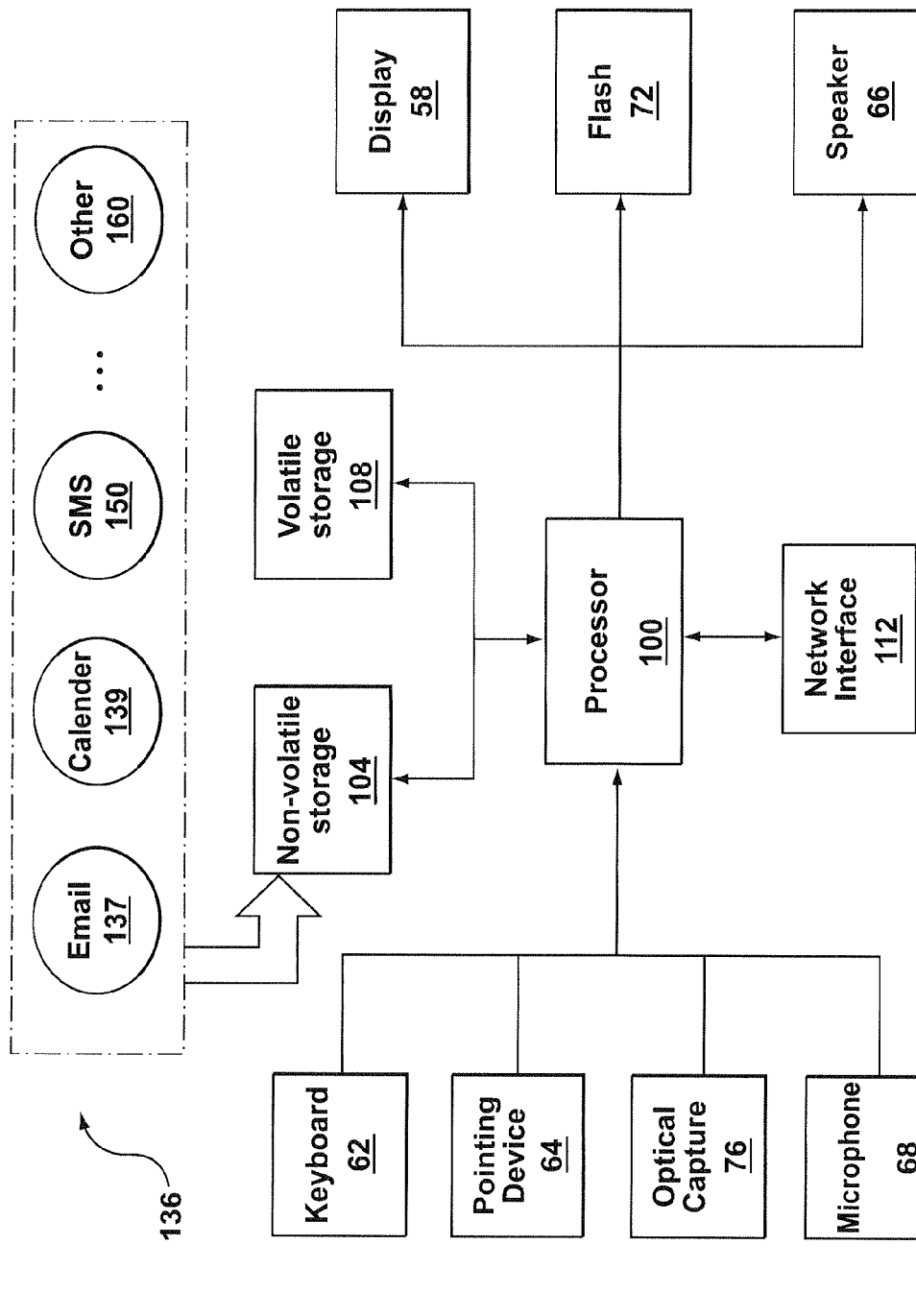
FIG. 3 is a block diagram of the electronic components of the device shown in FIGS. 1 and 2 according to a non-limiting embodiment.

FIG. 3 is a schematic block diagram of the electronic components of device 50. It should be emphasized that the structure in FIG. 3 is purely exemplary and is intended to be non-limiting. Device 50 includes a plurality of input devices which in a present embodiment includes keyboard 62, pointing device 64, and microphone 68, in addition to optical capture unit 76. Other input devices are contemplated. Input from keyboard 62, pointing device 64 and microphone 68 and optical capture unit 76 is received at a processor 100. Processor 100 can be configured to execute different programming instructions that can be responsive to the input received via input devices. To fulfill its programming functions, processor 100 is also configured to communicate with a non-volatile storage unit 104 (e.g. Erase Electronic Programmable Read Only Memory ("EEPROM"), Flash Memory) and a volatile storage unit 108 (e.g. random access memory ("RAM")). Programming instructions that implement the functional teachings of device 50 as described herein are typically maintained, persistently, in non-volatile storage unit 104 and used by processor 100 which makes appropriate utilization of volatile storage 108 during the execution of such programming instructions.

Processor 100 in turn is also configured to control display 58, speaker 66 and flash 72, also in accordance with different programming instructions and optionally responsive to different input receive from the input devices.

Processor 100 also connects to a network interface 112, which can be implemented in a present embodiment as a radio configured to communicate over a wireless link, although in variants device 50 can also include a network interface for communicating over a wired link. Network interface 112 can thus be generalized as a further input/output device that can be utilized by processor 100 to fulfill various programming instructions. It will be understood that interface 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11 (Wifi), Bluetooth™ or any of their variants or successors. It is also contemplated each network interface 112 can include multiple radios to accommodate the different protocols that may be used to implement different types of links. In the specific, non-limiting example, interface 112 is configured to provide 3G, Wifi and Bluetooth™ links.

Device 50 can be implemented with different configurations than described, omitting certain input devices or including extra input devices, and likewise omitting certain output devices or including extra input devices.

In a present embodiment, device 50 is also configured to maintain, within non-volatile storage 104, a plurality of applications 136, such as an email application 137, calendar application 139, short message service (SMS) application 150 and other applications 160 such as, for example, a phone application, social networking application, media player application, etc.

According to conventional programming methodologies, each application 136 may include a user interface for controlling display 58 via, for example, keyboard 62 and pointing device 64. This may be achieved by importing and extending a user interface API for the application, which may include a public abstract Screen class that manages screen images passed to it from the application 136, as discussed in greater detail below.

Figure 4:
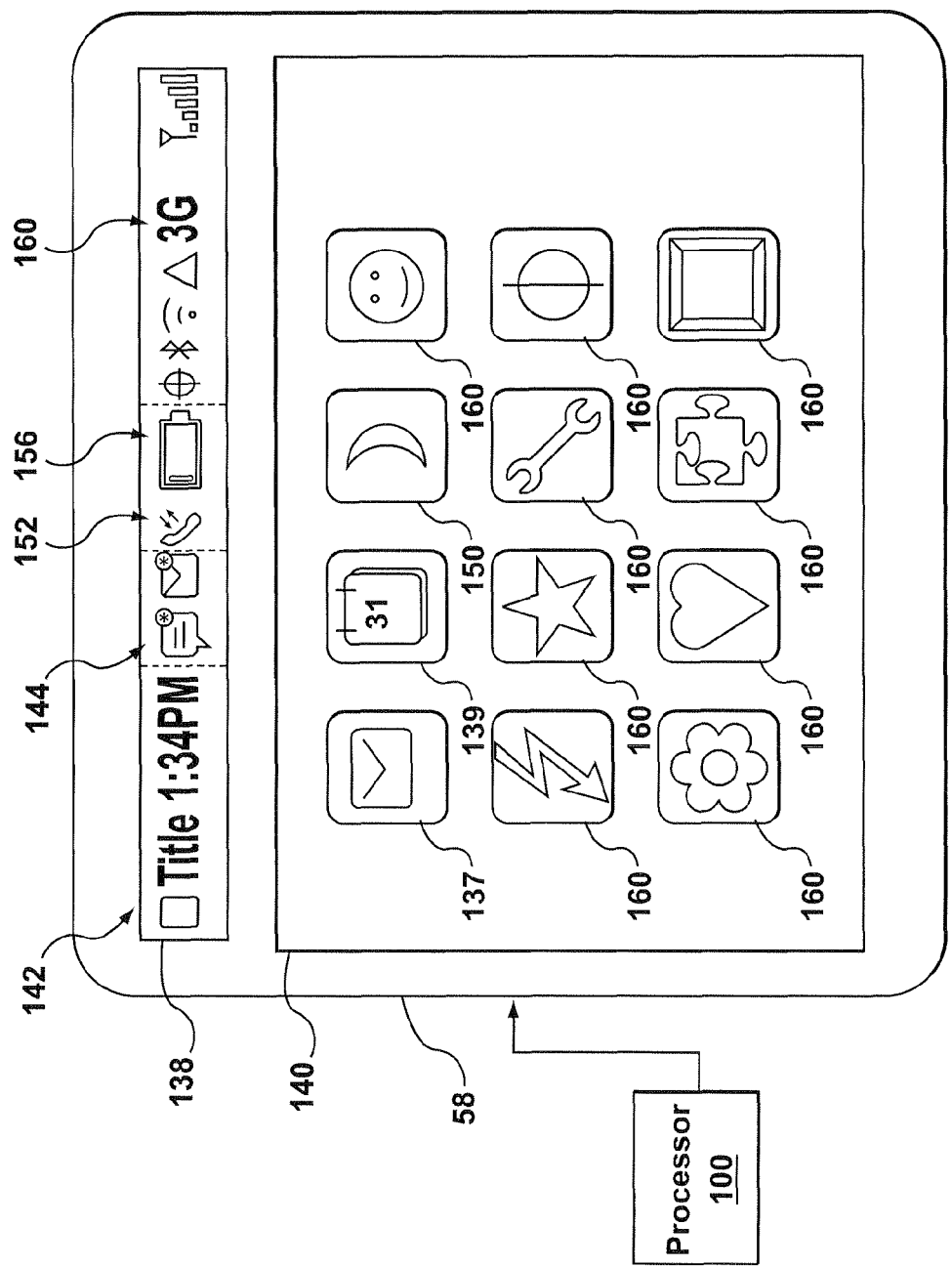
FIG. 4 shows a processor of FIG. 3 under control of a screen application of FIG. 3 for generating example title bar and content region screens on a display of the portable electronic device.

A non-limiting example of the foregoing is shown in FIG. 4, where processor 100 is shown as controlling display 58 to generate a title bar 138 and content region 140. According to the example embodiment, title bar 138 is divided into categories including icons representing a current state of information 142, notifications 144, pushed icons such as active call icon 152 and battery alert icon 156, and signals 160, as described in greater detail below. In the non-limiting example shown, the information 142 (i.e. icon, title string and time) are left aligned relative to the display 58, whereas the notifications 144, pushed icons 152 and 156 and signals 160 are right aligned.

The information area 142 of the bar may contain information relative to a specific application 136 and may be provided as a generally convenience to a user. The information region may, for example, include the following components: Title (String), which can be either a general title of the application or a String that provides information based on the current state of the application; a dynamically editable Icon(Image), which can be either a general application icon, or an icon that reflects the current state of the application (e.g. in a web browser this can be the page icon); and a Clock for displaying the current time.

The notifications area 144 provides visual information on the most recent notifications from applications 136 including but not limited to a current application and any other suitable applications.

The pushed status indicators, such as 152 and 156, are displayed on the title bar whenever certain defined criteria for being displayed are met. For example, the battery alert icon 156 may be displayed when either the battery level drops below 20%, the battery is being charged, or the application 136 requires that the battery icon always be displayed. Also, the battery icon may be displayed by and whenever a particular application 136 requires it.

The signals area provides details on the current connectivity status of the device 50, and may include a radio signal strength indicator, type of data connection (e.g. 3G, EDGE, etc.) and WiFi, GPS, BlueTooth and Roaming indicators to be displayed when appropriate (e.g. when the service associated with the indicator is enabled and/or connected).

Before discussing an example embodiment, it is helpful to note that in the absence of a common title bar, developers of applications 136 have been known to implement custom title bar components. This can lead to inconsistent presentation of title bar information across multiple applications 136 on a single device 50. Furthermore, the effort of such developers in designing such customized title bars is duplicated and additional memory and processing resources are required by each application to generate the various icons. Accordingly, a technical problem exists in how to optimize memory usage in a device 50 having multiple applications each requiring display of a title bar, such as the title bar 138.

In one embodiment, an application 136 may invoke a simple application programming interface (API) for generating the title bar 138. Since the API is common to all applications 136 that require display of the title bar 138, better processing and memory utilization can result on the device 50. Also, by providing a common API, the requirement to develop custom title bars for those applications 136 that require a title bar to be displayed, may be avoided. It should, however, be noted that those applications 136 which operate in full-screen mode may not be required to present a title bar.

Figure 5:
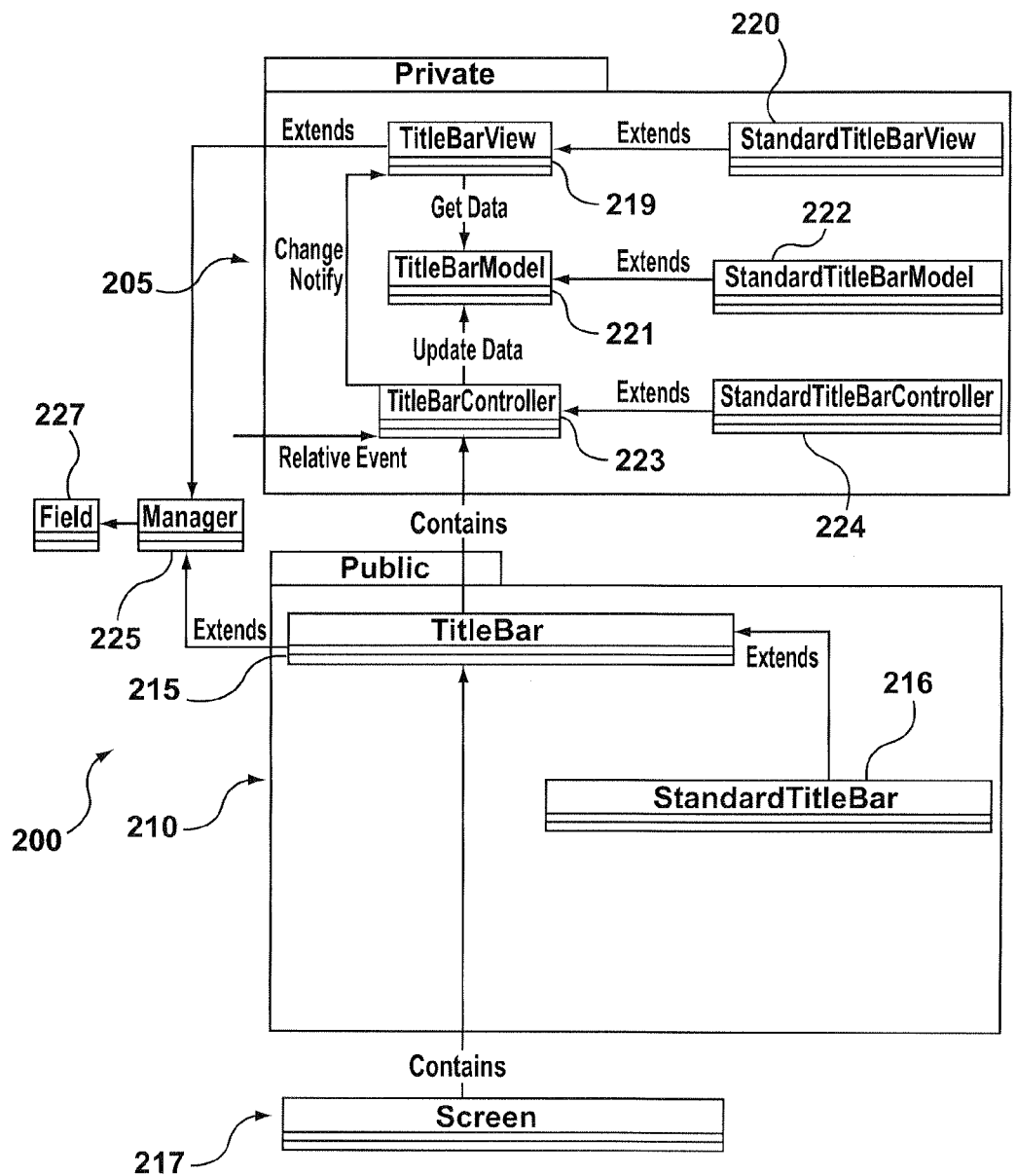
FIG. 5 is a class diagram for a non-limiting example of an API for enabling interaction between the screen application of FIG. 3 and other applications of FIG. 3.

FIG. 5 is a class diagram for a non-limiting example of an API 200 for enabling generation and control of title bar 138 by applications 136. The API contains two parts: an internal, private structural part 205 for managing the state of the title bar 138; and a creational, public part 210 that provides a simple interface to the applications 136 wishing to incorporate title bar 138 in their screen displays. The structural part 205 is an internal API for managing the state of the title bar 138. Public part 210 includes a TitleBar component or object 215 that is a member of the Screen class 217, and may be extended by a StandardTitleBar object 216, which is the public interface to the StandardTitleBar 216 and provides construction logic as well. The Screen class 217 may provide a setter function for adding and customizing the TitleBar object 215.

The private structural part 205 of the API 200 includes two abstract classes and one interface. TitleBarView 219 is the implementing class that provides the UI layout and drawing logic for the title bar 138, and may be extended by a StandardTitleBarView 220 which implements the user interface layout and drawing logic for a standard title bar. TitleBarModel 221 provides functionality to update components, and may be extended by a StandardTitleBarModel 222 which implements the data that defines the current state of the StandardTitleBar object 216. It is the responsibility of the classes that extend the TitleBarModel 221, such as StandardTitleBarModel 222, to define the data and provide validity checks for the data. TitleBarController 223 provides interface functionality with the TitleBarModel 221 and TitleBarView 219. It is the responsibility of the classes that extend the controller to define what causes changes in the Model and updates to the View.

The public part 210 of the API 200 includes the TitleBar class 215, which is a member of the Screen class 217 and any application 306 that requires display of title bar 138 must extend it in order to avail itself of the set and get functionality of the Screen class. It is the responsibility of the class that implements TitleBar 215 to provide a set of functionality to construct the title bar 138 and define its customizable components. StandardTitleBar 216 accomplishes this by providing several add/remove methods for adding optional components to the title bar, as shown in FIG. 5.

Figure 6:
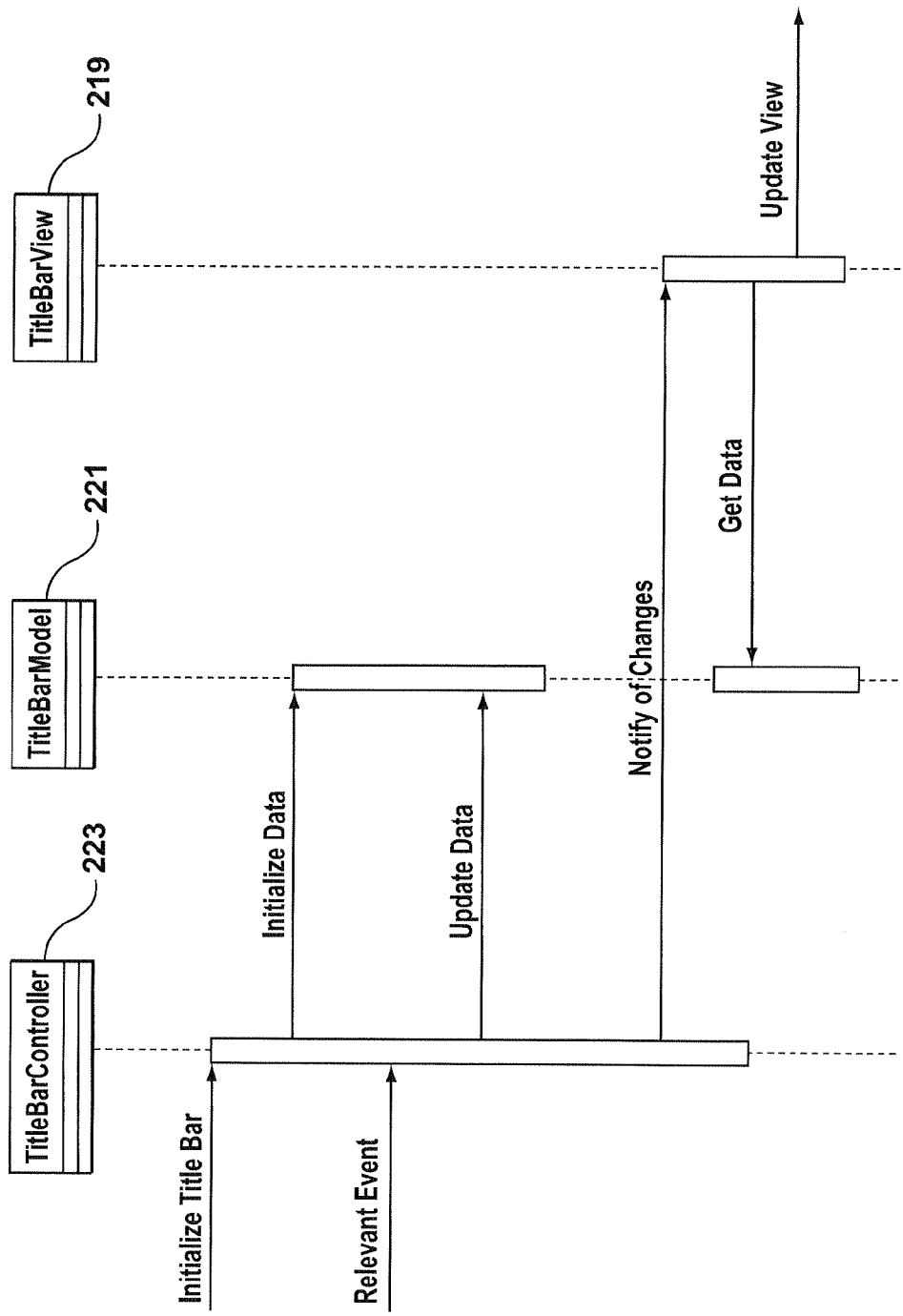
FIG. 6 is a sequence diagram illustrating the flow of actions that result in the title bar of FIG. 4 being updated and/or created.

FIG. 6 is a sequence diagram illustrating the flow of actions that result in the title bar 138 being updated and/or created. TitleBarController 223 is responsible for listening and processing events, as well as updating the model 221 and informing the view 219 that they need to update/redraw. TitleBarModel 221 has no knowledge of TitleBarView 219 or TitleBarController 223 and TitleBarView 219 is responsible only for getting the data encapsulated by TitleBarModel 221 and has no knowledge about TitleBarController 223.

Returning to the defined classes, implementation details of non-limiting examples will be set forth. As shown in FIG. 5, TitleBar 215 is a component that is added to the Screen class 217 as a field. TitleBar extends Manager 225 and therefore inherits all of the functionality provided by Field 227 and Manager 225. The only member variable of TitleBar 215 is the TitleBarController object 223, which is package-private. It is the responsibility of any internal classes that inherit from TitleBar 215 to define the allocation of the TitleBarController 223.

TitleBar 215 has two package-private methods to facilitate adding and removing components from the title bar 138: TitleBar#addComponent(String, Object) and TitleBar#removeComponent(String). Both have a componentKey parameter that defines which component to add or remove, and TitleBar#addComponent( ) has a value Object that defines the value of the component. TitleBar 215 passes all component keys and values with no knowledge of what is an appropriate paring or even if the component key is valid, and therefore no exceptions to be thrown no matter what component keys and values it passes. In the non-limiting example set forth herein, there is no public functionality provided by TitleBar 215, although it is contemplated that the TitleBar may optionally be extended.

Non-limiting examples of TitleBar members are included in Table A, as follows:

TABLE A

```
/**
* The TitleBarController for the TitleBar implementation.
*
* @category Internal
*/
/*package*/ TitleBarController __controller;
/**
* Provides a common way of adding a TitleBar implementation specific
* component.
*
* @param componentKey Key that represents the title bar component.
* @param value Value of the title bar component.
*
* @category Internal
*/
/*package*/ void addComponent(String componentKey, Object value);
/**
* Provides a common way to remove a TitleBar implementation specific
* component.
*
* @param componentKey Key that represents the title bar component.
*
* @category Internal
*/
/*package*/ void removeComponent(String componentKey);
```

StandardTitleBar 216 extends TitleBar 215, and is the component class for a standard title bar implementation. As with any title bar implementation, StandardTitleBar 216 is required to supply a mechanism to construct an instance of the title bar 138. According to a non-limiting example, a hybrid Builder/JavaBean pattern is used, as described below. However, it is contemplated that instances of title bar 138 may be effected via a default constructor.

StandardTitleBar 216 has several optional components. Each optional component contains a pair of functions that are prefixed with "add" and "remove", respectively. For example, the StandardTitleBar 216 has a component for an application title that is optional. Hence, the StandardTitleBar class has two functions to facilitate adding and removing a title from the application's current screen's title bar; StandardTitleBar#addTitle(String title) and StandardTitleBar#removeTitle( ).

StandardTitleBar 216 has two push components that are required; the battery icon 156 and the active phone call indicator 152, as shown in FIG. 4 and discussed below. By default, the battery icon 156 will only be shown if the battery level drops below 20% or if the battery is currently charging. However, an application 136 can change this behavior by modifying a visibility setting for the icon using StandardTitleBar#setBatteryIconVisibility(int). Each adder method, and the battery's setter, returns the StandardTitleBar object 216 that the component was added to. This allows for calls to the adder methods to be chained together.

Since each optional component of the title bar 138 is singular, when there are multiple calls to a component's adder function, in the cases where new data is provided, the latest call overwrites the data provided in previous calls. Adder methods that take data, such as the title mentioned above, can accept any value that matches its defined parameter's data type, including null. The order in which adder methods are called has no effect on the layout of the title bar 138. The title bar component positioning may be predefined so as not to be altered by the applications that use the title bar implementation.

Declaration of the add/remove methods that are referenced above is set forth in Table B, as follows:

TABLE B

```
/**
* Creates a new empty StandardTitleBar.
*/
public StandardTitleBar( );
/**
* Adds a new icon to the StandardTitleBar object. Note that the icon
* image can be of any size as the image will be resized to fit in the
* title bar's dimensions. Icons will be resized to squares the size of
* defined icon height for the title bar, stretching the aspect ratio
* when the supplied Image's dimensions are not a square.
*
* @param icon The new icon Image for the StandardTitleBar object.
* @return The StandardTitleBar component this icon was added to.
*/
public StandardTitleBar addIcon(String iconFile);
/**
* Adds an application icon to the StandardTitleBar object.
*
* <p>The icon can be of any size and aspect ratio. The icon's
* size will be scaled to the title bar's required icon size and its aspect
* ratio stretcthed to a 1:1 aspect ratio.
*
* Since each StandardTitleBar only has one icon component, multiple calls
* to addIocn( ) will result in the latest call overwritting the previous
* definition of the icon.</p>
*
* @param icon Bitmap object of the icon image.
* @return The StandardTitleBar component the icon was added to.
*
* @category Open
*/
public StandardTitleBar addIcon(Bitmap icon);
/**
* Removes the defined icon from the title bar. No action take if one
* is not defined for the title bar.
*/
public void removeIcon( );
/**
* Adds a new title String to the StandardTitleBar object. There is no
* length restriction on the title, though any titles that are too long to
* be displayed in whole will be truncated and ellipsises will be appended
* to show that the full title is not displayed.
*
* @param title The new title String for the StandardTitleBar object.
* @return The StandardTitleBar component this title was added to.
*/
public StandardTitleBar addTitle(String title);
/**
* Removes the define title for the title bar. No action taken if one is
* not defined for the title bar.
*/
public void removeTitle( );
/**
* Adds a clock component to the StandardTitleBar object.
*
* @return The StandardTitleBar component this clock was added to.
*/
public StandardTitleBar addClock( );
/**
* Removes the defined clock component for the title bar. No action is
* taken if no clock is defined.
*/
public void removeClock( );
/**
* Adds the notifications component to the StandardTitleBar object.
*
* @return The StandardTitleBar component this notifications component
```

TABLE B-continued

```
* was added to.
*/
public StandardTitleBar addNotifications( );
```

TitleBarModel 221 encapsulates the data that defines the current state of the title bar 138. TitleBarModel 221 is not required to do any processing, but merely keep the data separate from the view logic and event logic. It has functionality to allow controlled access to its data, for example as required by TitleBarView 219, and supplies functionality to manipulate the data that defines the state of the title bar 138, which may be used by the TitleBarController 223 when events require it.

The only functions declared by the TitleBarModel 221 are for initialization. It is the responsibility of the sub-classes to define the required accessors for their implementation.

The following data requirements have been defined for the standard title bar implementation:

Title—Set during construction and may be dynamically updated (see 142 in FIG. 4);

Icon—Set during construction and may be dynamically updates (see 142 in FIG. 4);

Clock—Defined whether it is enabled or not during construction (see 142 in FIG. 4);

Active Phone Call—Controller 223 listens for events related to phone call activity, and state is updated based on such events (see 152 in FIG. 4);

Notifications—Controller 223 listens for events for events related to notifications, with new notifications being added to a queue that is maintained by StandardTitleBarModel 222 and removed when a notification dismissal event is received (see 144 in FIG. 4);

GPS—Defined if enabled during construction and if active the controller 223 listens for GPS connectivity events and updates the model's GPS notification state based on these events (see 160 in FIG. 4);

BlueTooth—The controller 223 listens for BlueTooth connectivity and activity events and updates the model's BlueTooth notification state based on these events (see 160 in FIG. 4);

Battery—Defined during construction so as to always by displayed or to be displayed only when reaching a minimum threshold, in which case the controller 223 listens for battery update events or a "less than 20%" event (see 156 in FIG. 4);

Connectivity—The controller 223 listens for all events related to connectivity and updates the model's connectivity notifications based on these events (see 160 in FIG. 4). Thus, for example, an application 136 can show the current data connection that it is connected to or using (e.g. WiFi or cellular data such as 3G or EDGE network).

The TitleBarController 223 is responsible for coordinating all the parts of the title bar implementation, including constructing and communicating changes to the model 221 and the view 219, and the view 219, collecting application specifics through the TitleBar component class 215, listening for system events that affect the title bar's components, and then updating the model and the view based on those events.

StandardTitleBarController 224 extends TitleBarController 223 for the standard title bar implementation shown in FIG. 4, and its implementation details are as follows:

StandardTitleBarController 224 contains a getter method for each element that is part of the title bar 138, where the getter returns the relevant data for each element.

StandardTitleBarController 224 contains an initialize method for each element that is part of the title bar 138, where the initialize methods update the relevant data for the element without notifying the view to update.

StandardTitleBarController 224 contains an update method for each element that is part of the title bar 138, where the update methods update the relevant data for the element and notify the title bar's view to update and redraw.

StandardTitleBarController 224 provides implementations for each relevant event listener, where the methods that implement the event listener interfaces call upon the appropriate update methods for the event.

Non-limiting examples of StandardTitleBarController members are included in Table C, as follows:

TABLE C

```
/**
* Sets the title to be displayed by the title to the one provided.
*
* @param title Title to be displayed by the title bar.
*/
public void initializeTitle(String title);
/**
* Sets the title to be displayed by the title bar and notifies that
* the title bar needs to be redrawn.
*
* @param title Title to be displayed by the title bar.
*/
public void updateTitle(String title);
/**
* @return the current title string for the title bar instance.
*/
public String getTitle( );
```

As discussed above, the title bar implementation is integrated into the Screen call 217, which includes setter and getter methods. According to a non-limiting example, the Screen#setTitleBar(TitleBar titleBar) method takes a TitleBar object as its lone parameter, which is predefined by the application 136, and the Screen#getTitleBar( ) method returns the current definition of the Screen's TitleBar object. The application 136 determines the type and typecast of the returned object before performing any manipulation.

Non-limiting examples of the foregoing are shown in FIGS. 7-21, where processor 100 controls display 58 to generate title bar 138 with content selected based on the requirements of application 136, as defined using the API 200.

Figure 7:
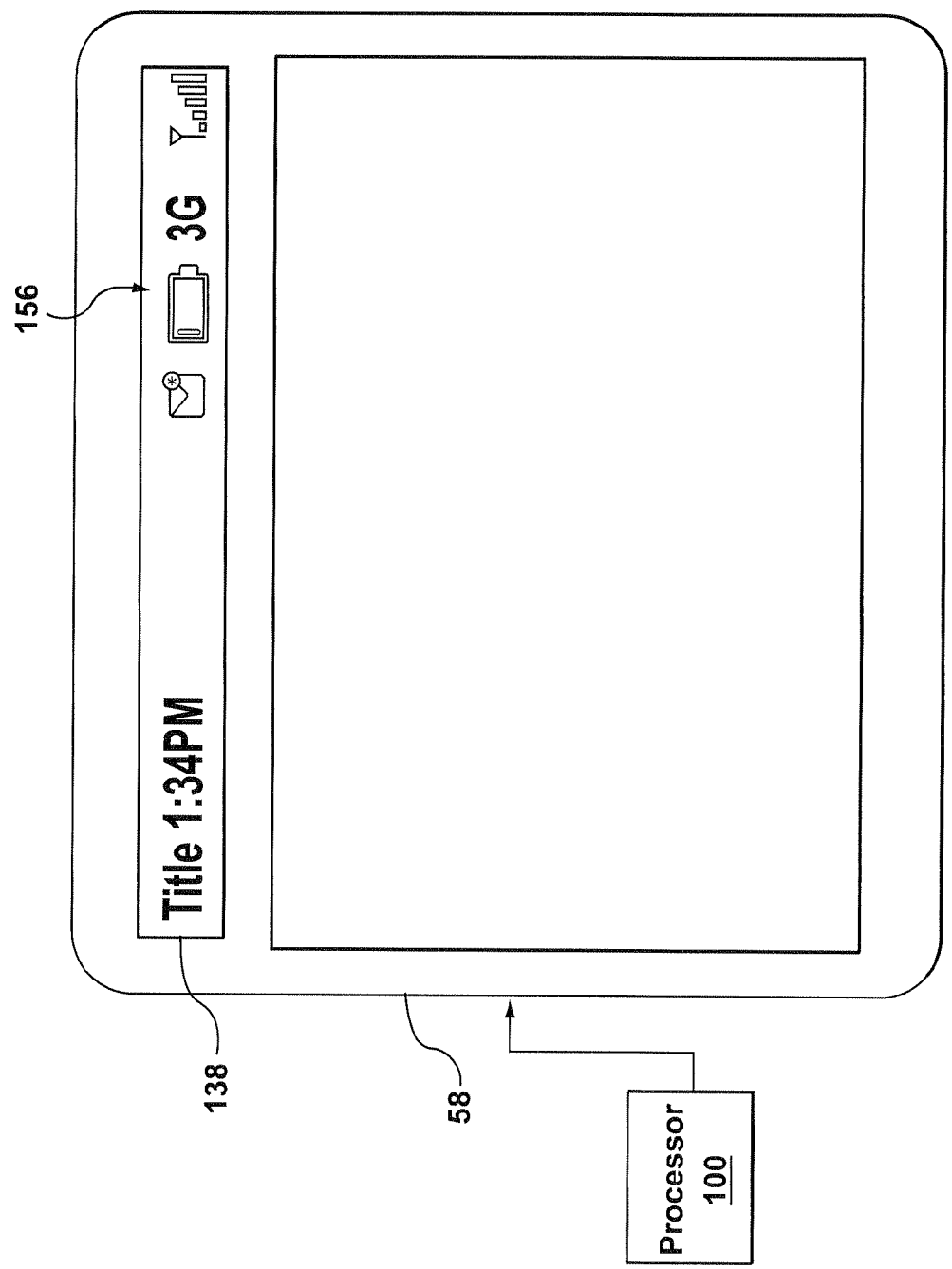
FIGS. 7 and 8 show the processor of FIG. 3 under control of the screen application of FIG. 3 for causing the display to generate pushed icons.
Figure 8:
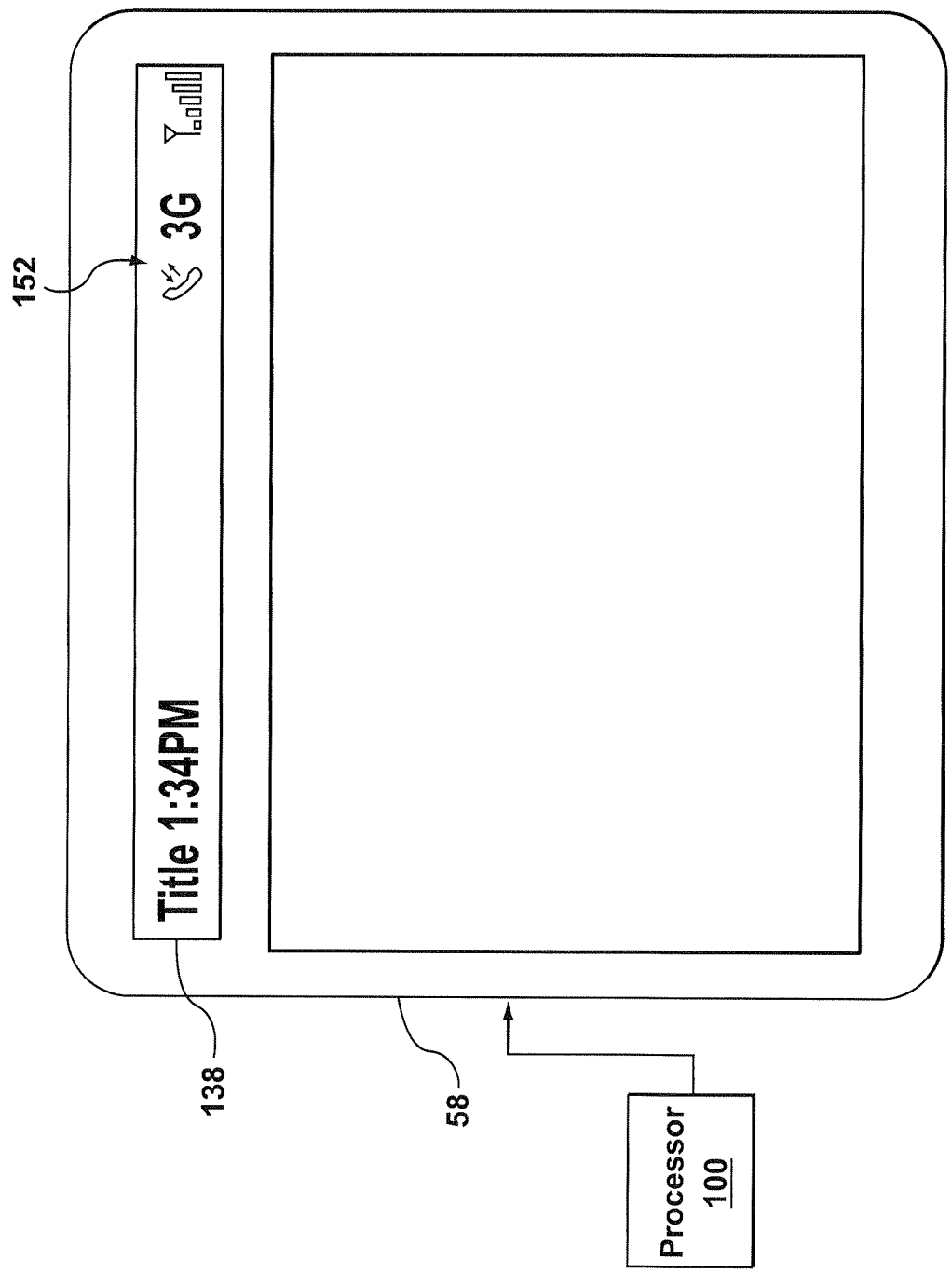

FIGS. 7 and 8 show processor 100 causing display 58 to generate pushed icons: battery icon 158 in FIG. 7, to indicate a low battery condition.

Figure 9:
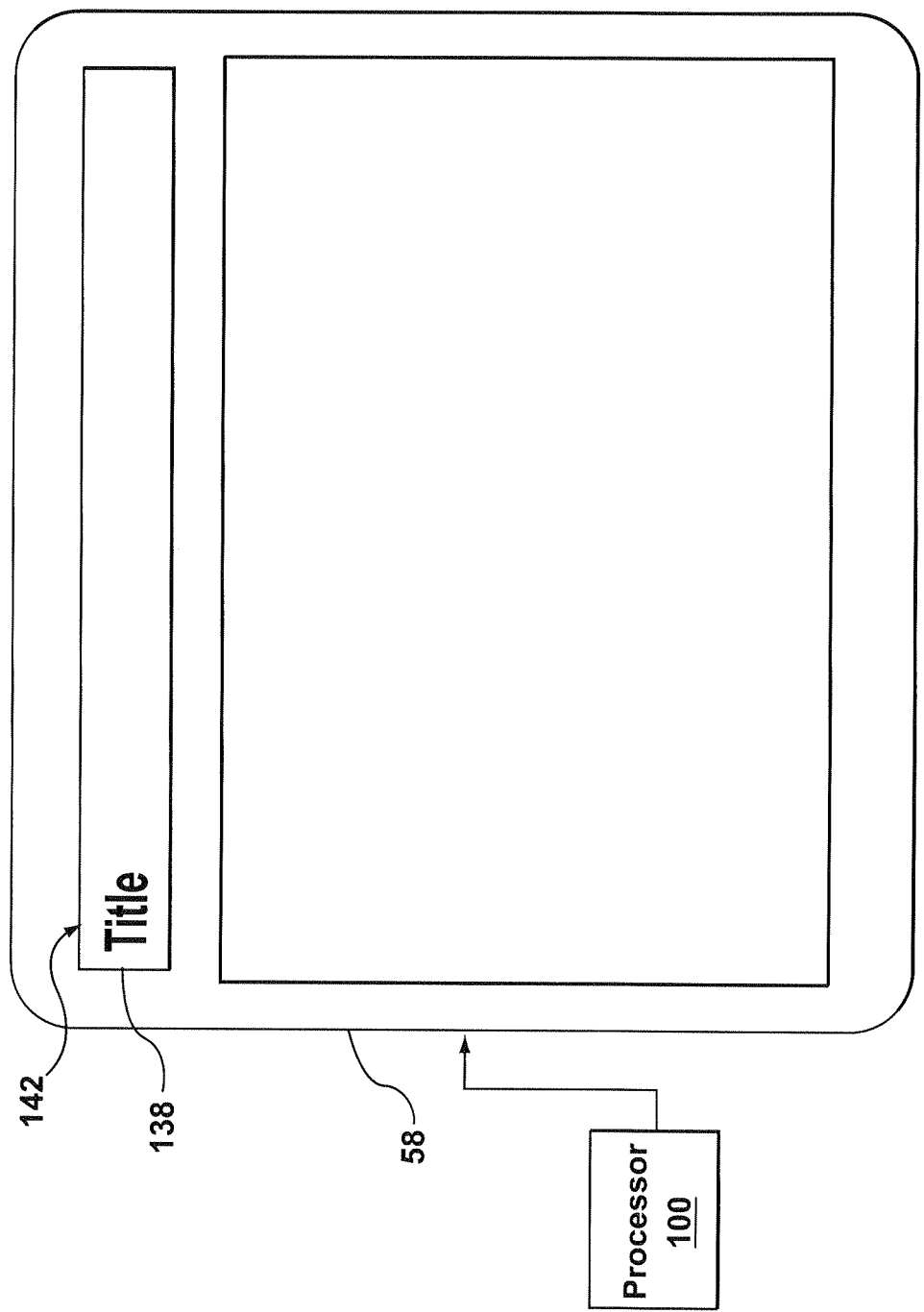
FIG. 9 shows the processor of FIG. 3 under control of the screen application of FIG. 3 for causing the display to generate a default title bar with only the appearing in an information area.

FIG. 9 shows processor 100 causing display 58 to generate a default title bar 138 with title (only) appearing in the information area 142.

Figure 10:
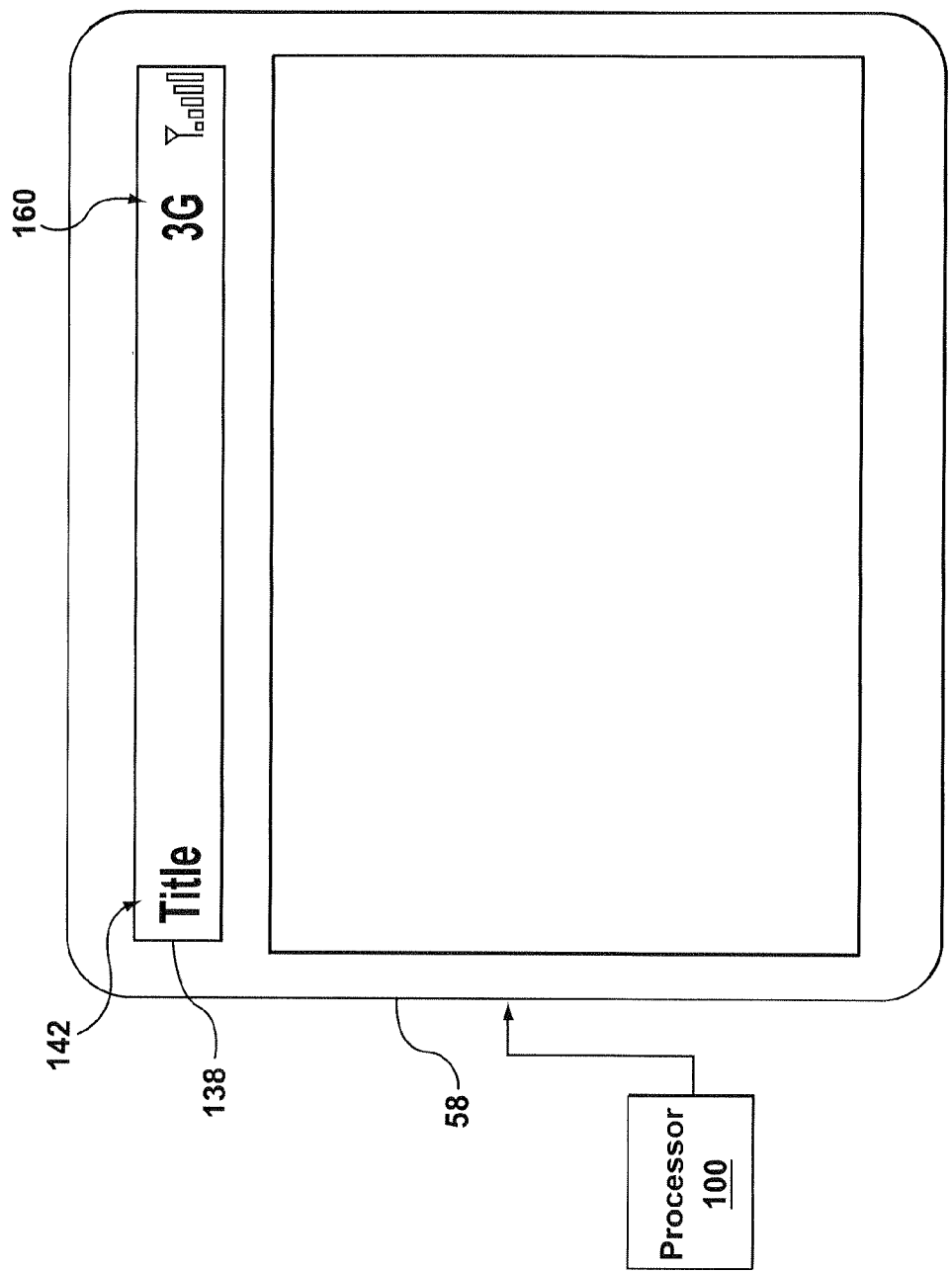
FIG. 10 shows the processor of FIG. 3 under control of the screen application of FIG. 3 for causing the display to generate a title bar for an application that requires network access.

FIG. 10 shows processor 100 causing display 58 to generate title bar 138 for an application 136 that requires network access.

Figure 11:
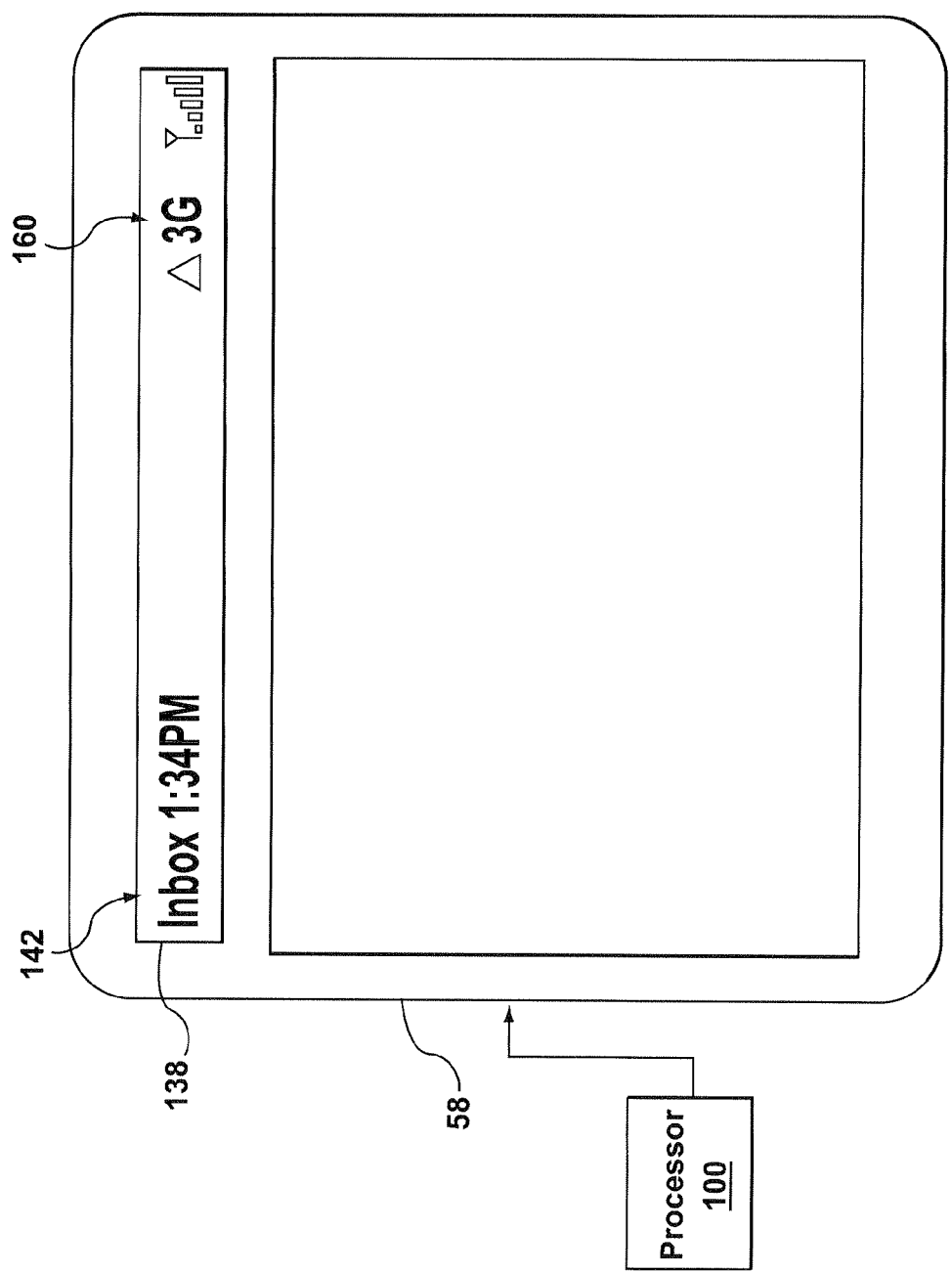
FIG. 11 shows the processor of FIG. 3 under control of the screen application of FIG. 3 for causing the display to generate a title bar for an application that requires network access and time to be displayed.

FIG. 11 shows processor 100 causing display 58 to generate title bar 138 for an application 136 that requires network access and time to be displayed.

Figure 12:
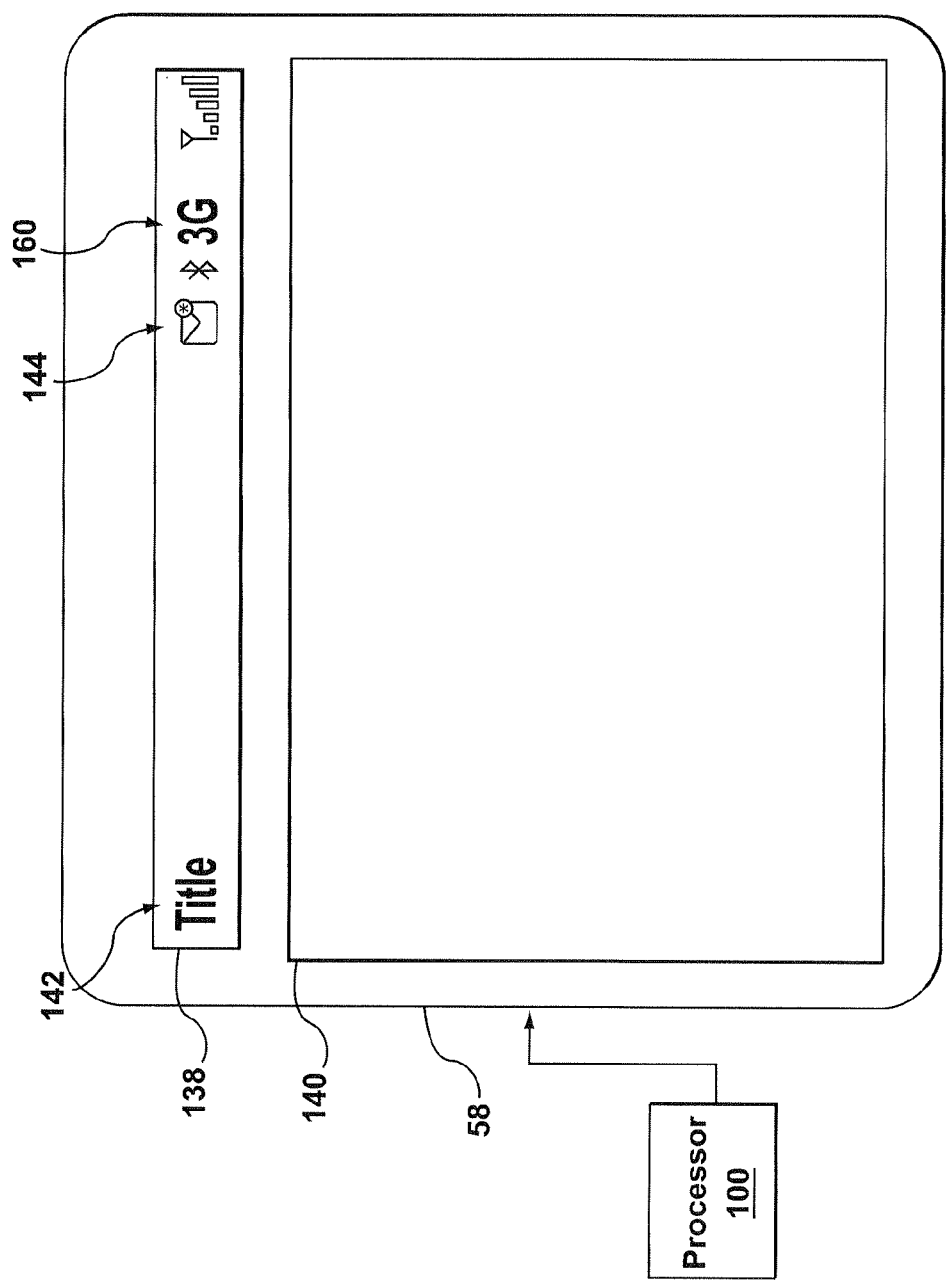
FIG. 12 shows the processor of FIG. 3 under control of the screen application of FIG. 3 for causing the display to generate a title bar for an application that requires network access, time and notifications to be displayed.

FIG. 12 shows processor 100 causing display 58 to generate title bar 138 for an application 136 that requires network access, time and notifications to be displayed.

Figure 13:
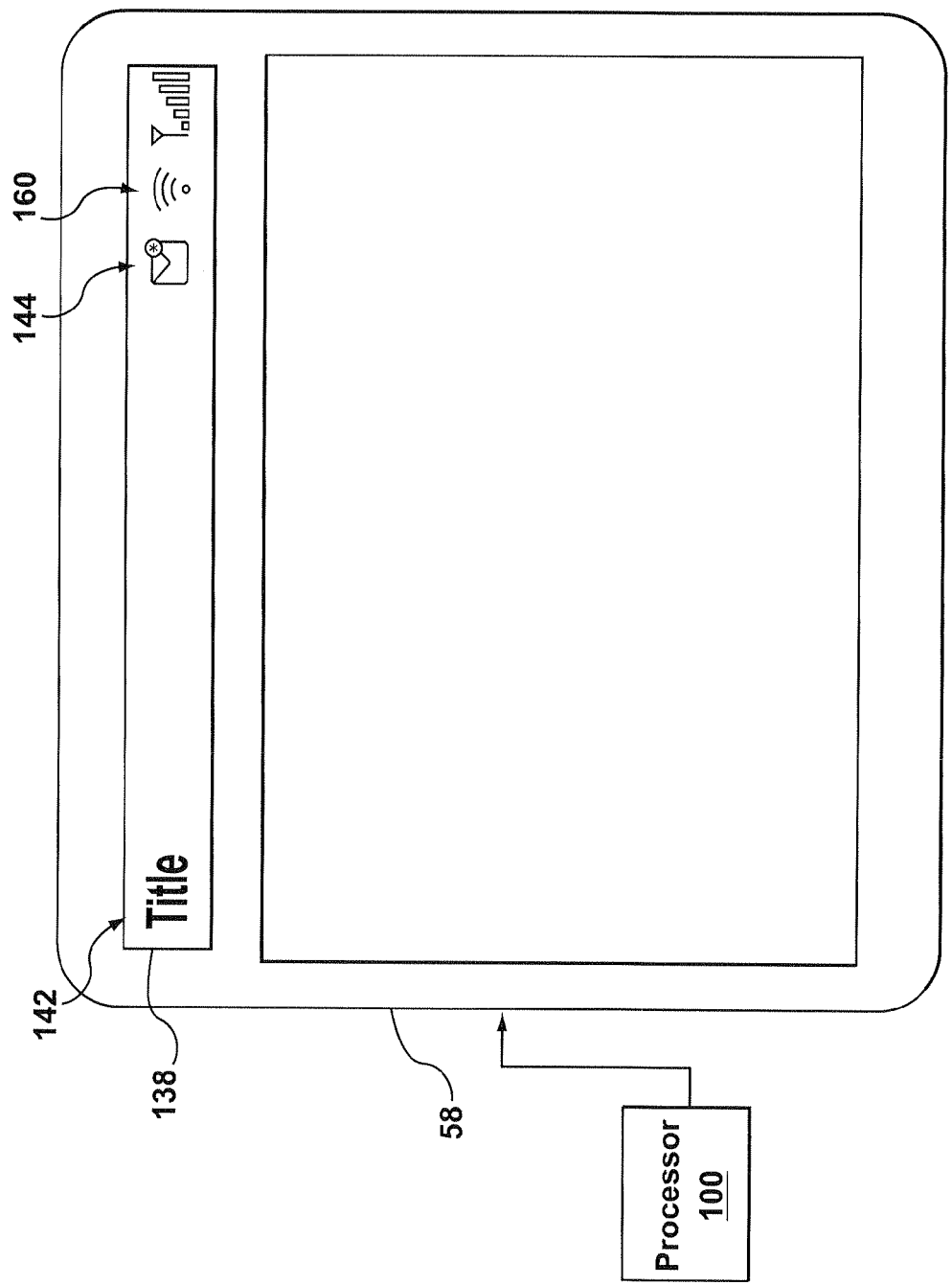
FIG. 13 shows the processor of FIG. 3 under control of the screen application of FIG. 3 for causing the display to generate a title bar for an application that requires network access and which indicates that the application is using an available WiFi connection.

FIG. 13 shows processor 100 causing display 58 to generate title bar 138 for an application 136 that requires network access and which indicates that the application is using an available WiFi connection.

Figure 14:
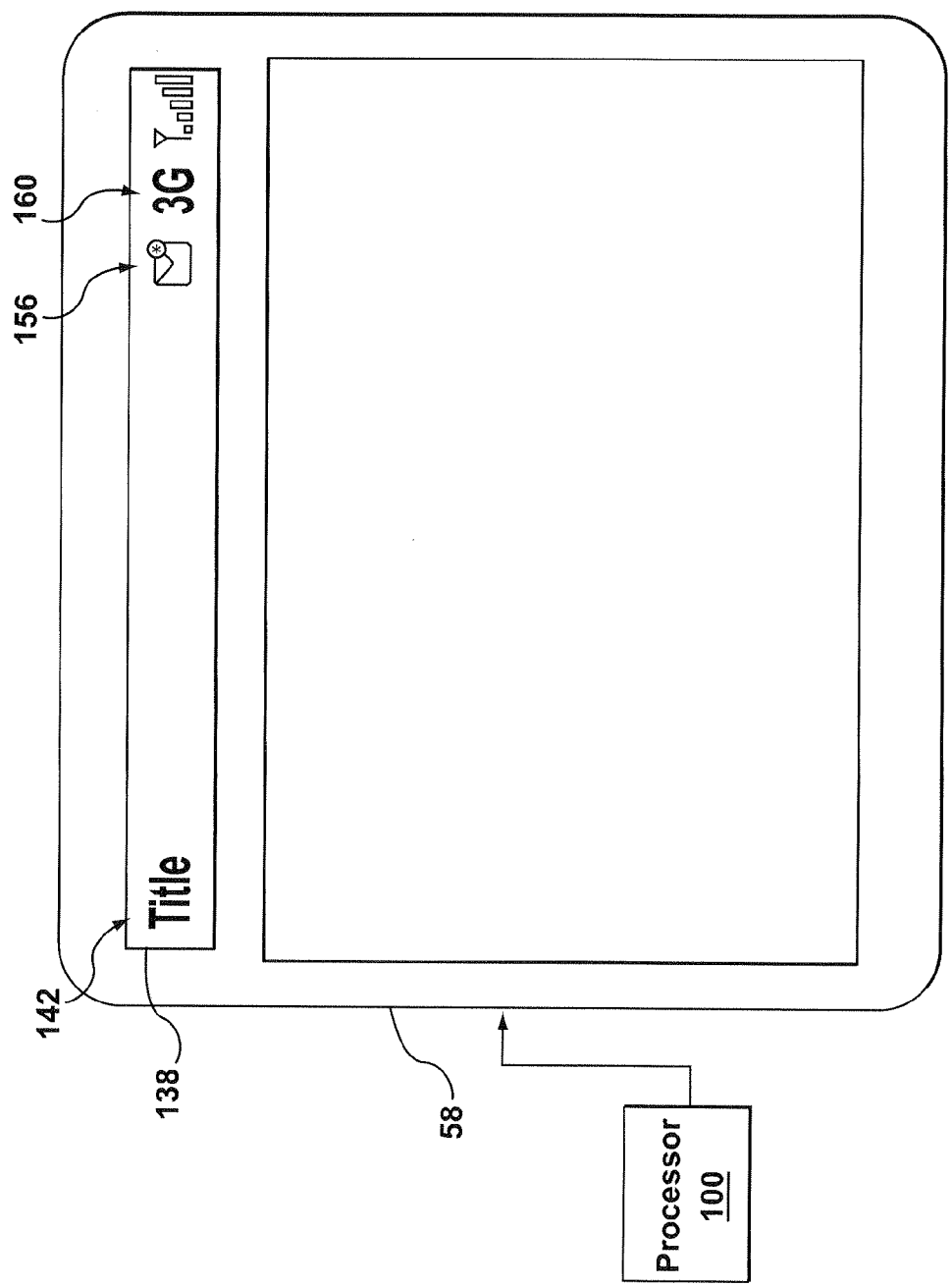
FIG. 14 shows the processor of FIG. 3 under control of the screen application of FIG. 3 for causing the display to generate a title bar for an application that requires network access and which indicates that the application is using an available 3G service.

FIG. 14 shows processor 100 causing display 58 to generate title bar 138 for an application 136 that requires network access and which indicates that the application is using an available 3G service.

Figure 15:
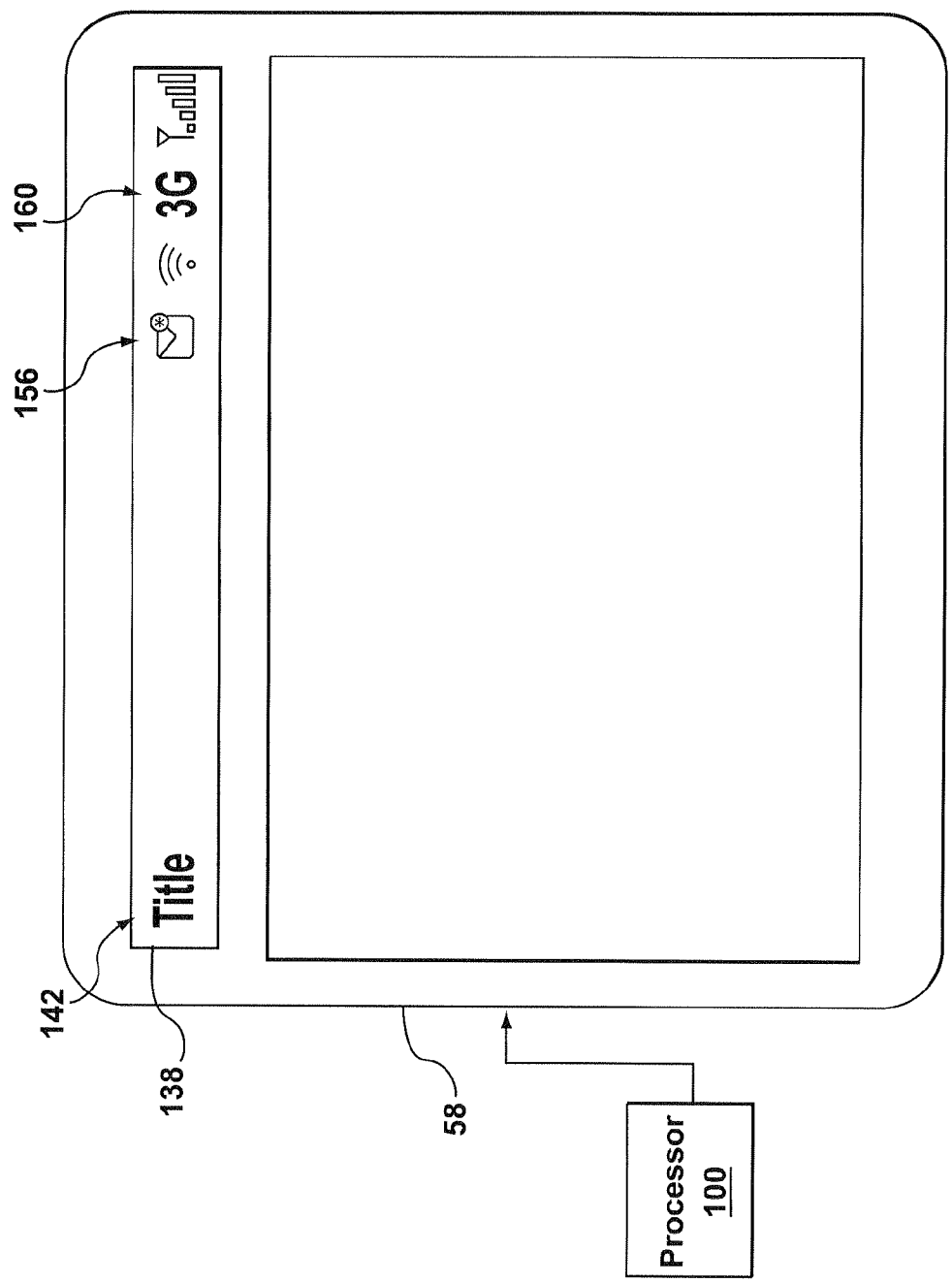
FIG. 15 shows the processor of FIG. 3 under control of the screen application of FIG. 3 for causing the display to generate a title bar for an application that requires network access and which indicates that the application is using an available WiFi connection, with 3G service available.

FIG. 15 shows processor 100 causing display 58 to generate title bar 138 for an application 136 that requires network access and which indicates that the application is using an available WiFi connection, with 3G service available.

Figure 16:
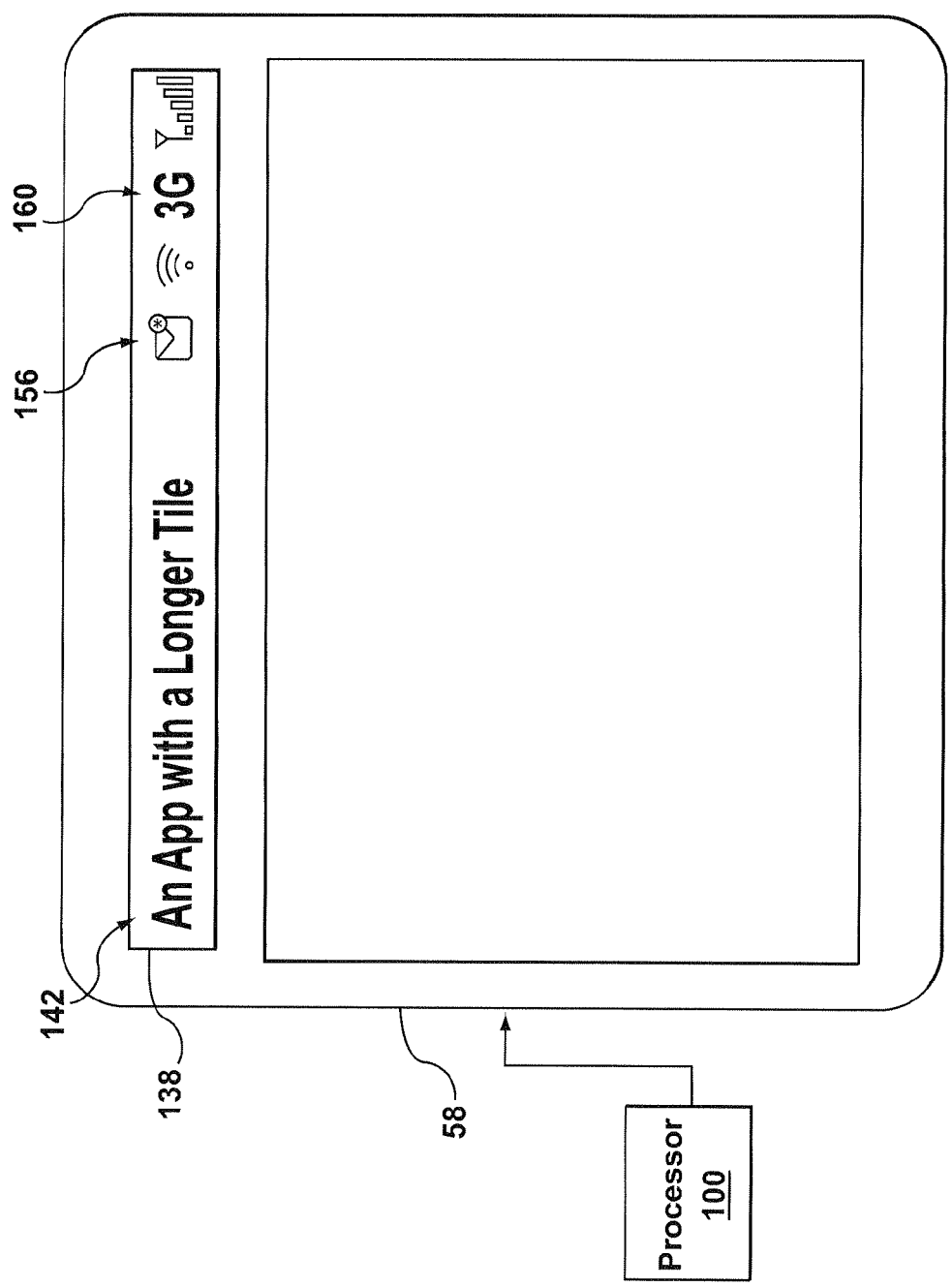
FIG. 16 shows the processor of FIG. 3 under control of the screen application of FIG. 3 for causing the display to generate a title bar for an application having a long title and that has received an email notification, wherein a minimum of two slots are available for notifications and wherein title truncation is effected if necessary to make the two slots available.

FIG. 16 shows processor 100 causing display 58 to generate title bar 138 for an application 136 having a long title and that has received an email notification, wherein a minimum of two slots are available for notifications and wherein title truncation is effected if necessary to make the two slots available.

Figure 17:
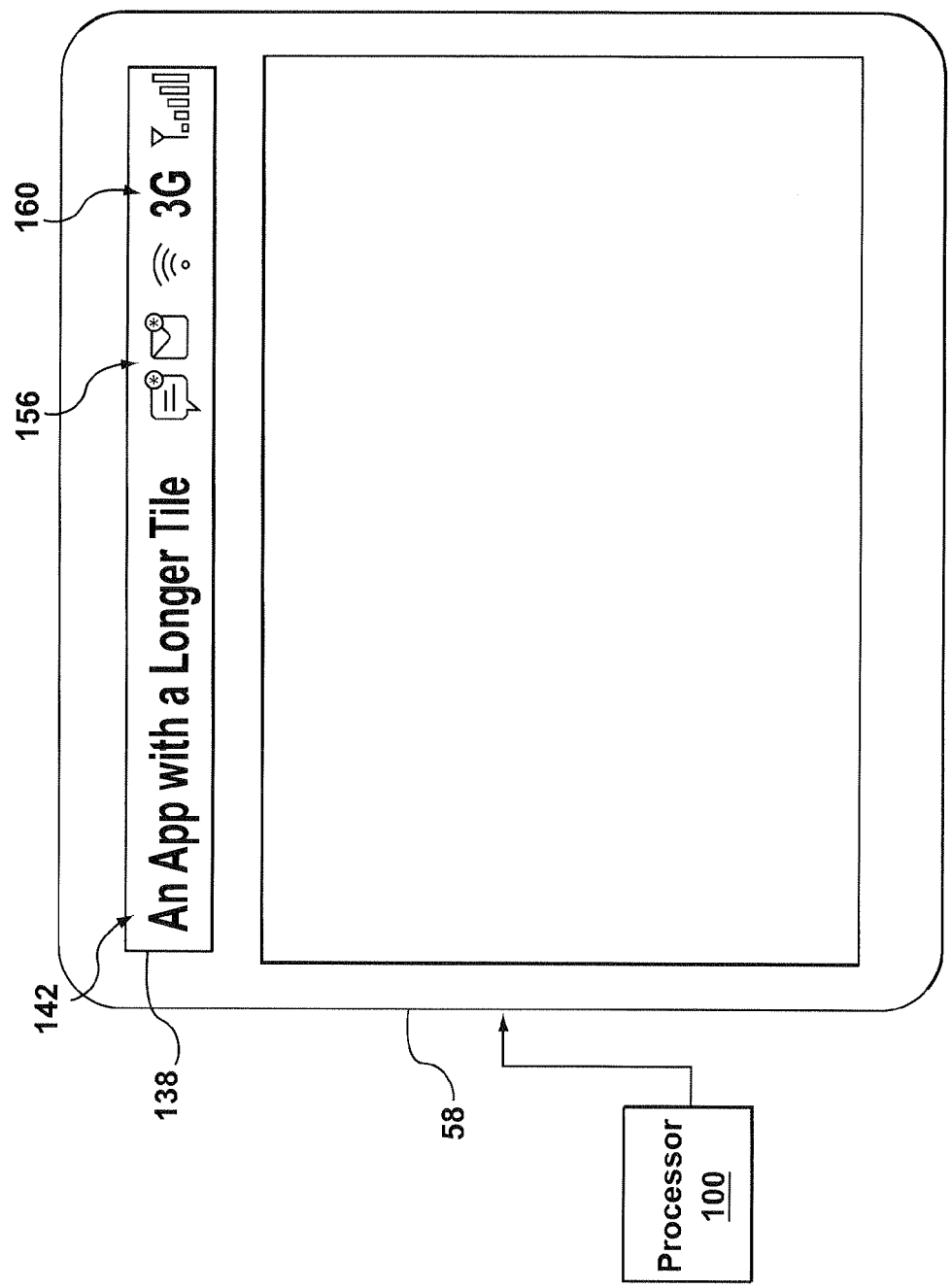
FIG. 17 shows the processor of FIG. 3 under control of the screen application of FIG. 3 for causing the display to generate a title bar for an application having a long title and that has received an email notification and an instant messaging notification.

FIG. 17 shows processor 100 causing display 58 to generate title bar 138 for an application 136 having a long title and that has received an email notification and an instant messaging notification.

Figure 18:
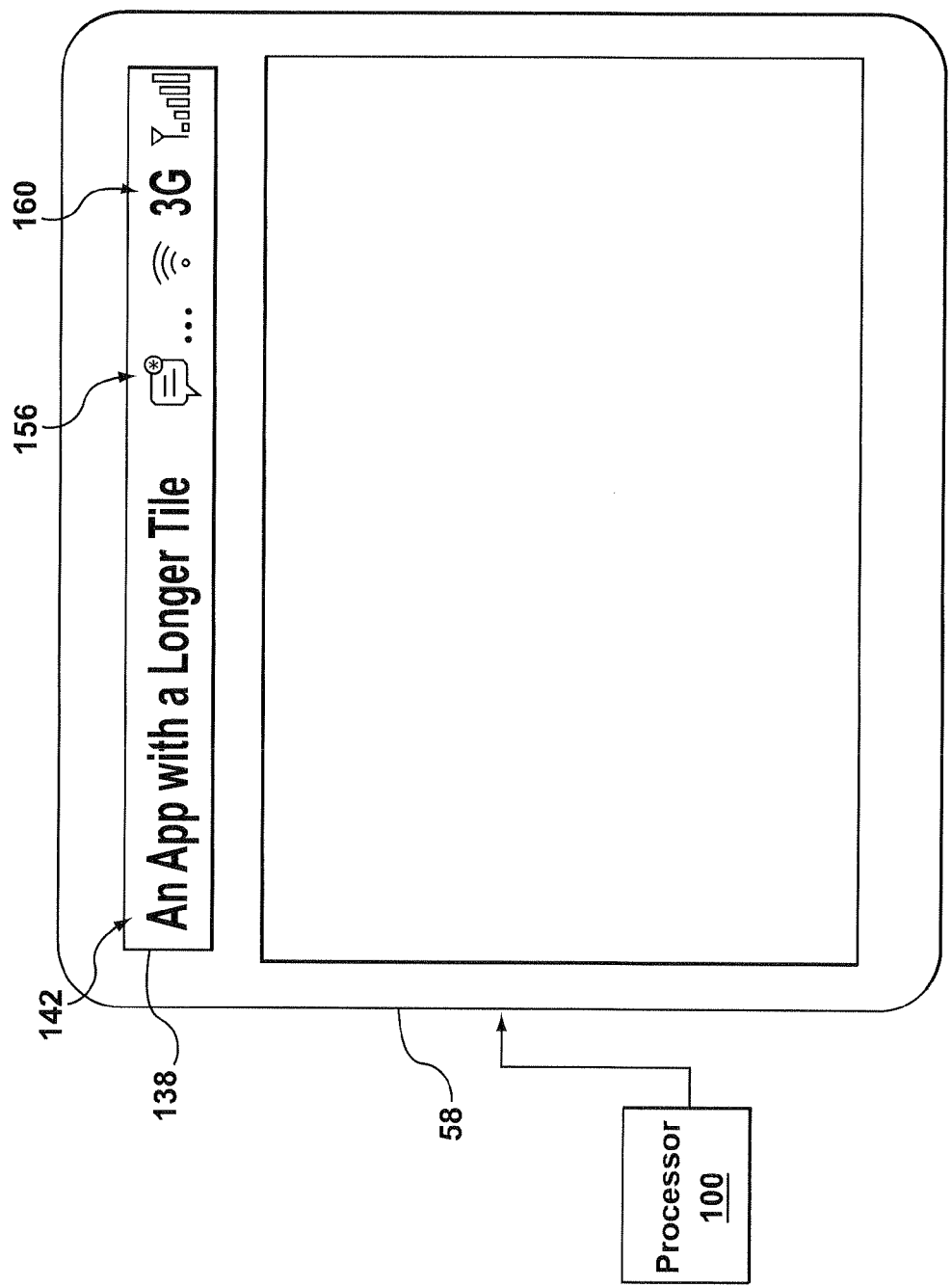
FIG. 18 shows the processor of FIG. 3 under control of the screen application of FIG. 3 for the causing display to generate a title bar for an application having a long title and that has received an SMS notification.

FIG. 18 shows processor 100 causing display 58 to generate title bar 138 for an application 136 having a long title and that has received an SMS notification.

Figure 19:
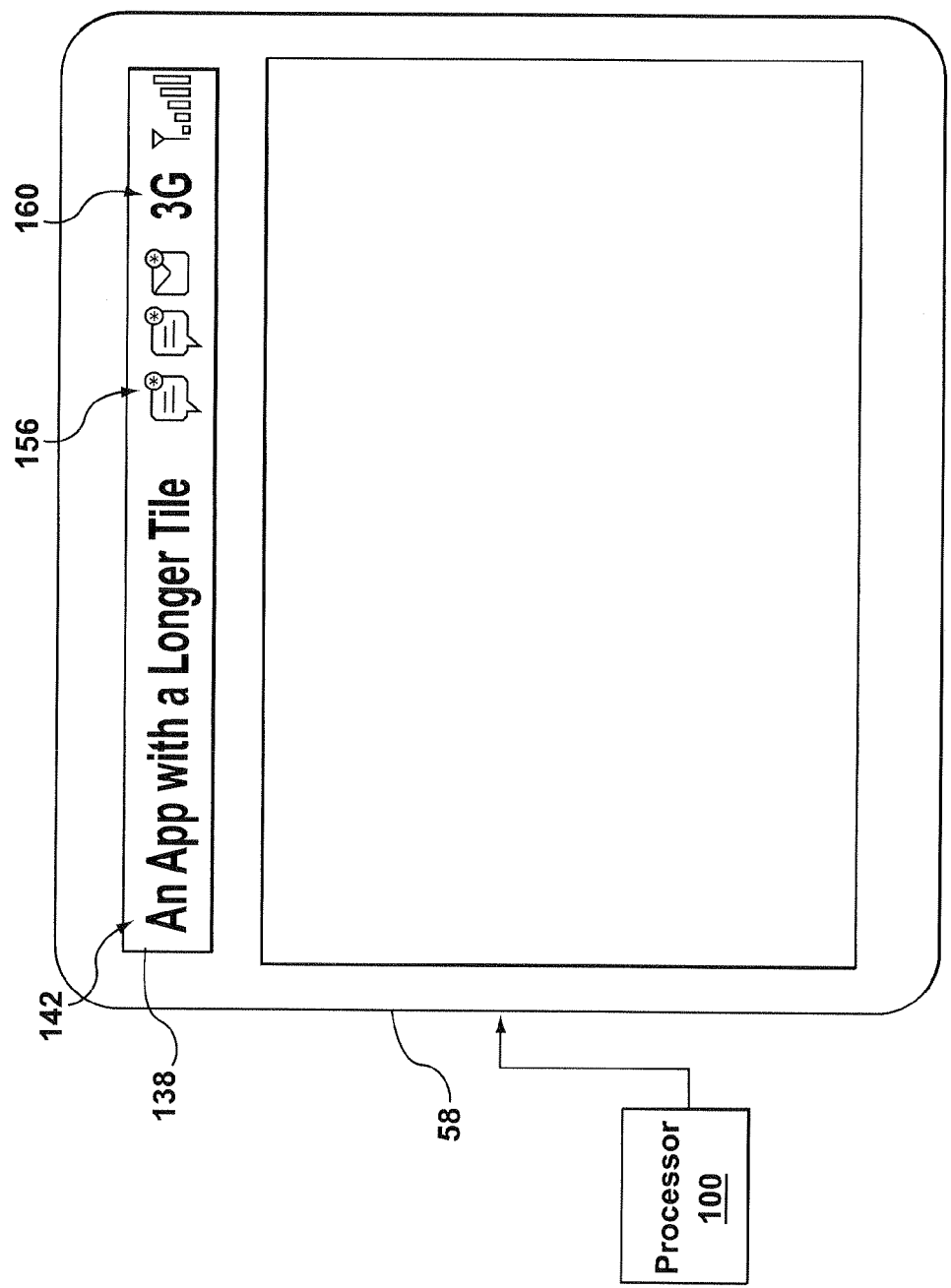
FIG. 19 the processor of FIG. 3 under control of the screen application of FIG. 3 for the causing display to generate a title bar for an application having a long title, with WiFi disabled, and that has received email, SMS and instant messaging notifications.

FIG. 19 shows processor 100 causing display 58 to generate title bar 138 for an application 136 having a long title, with WiFi disabled, and that has received email, SMS and instant messaging notifications.

Figure 20:
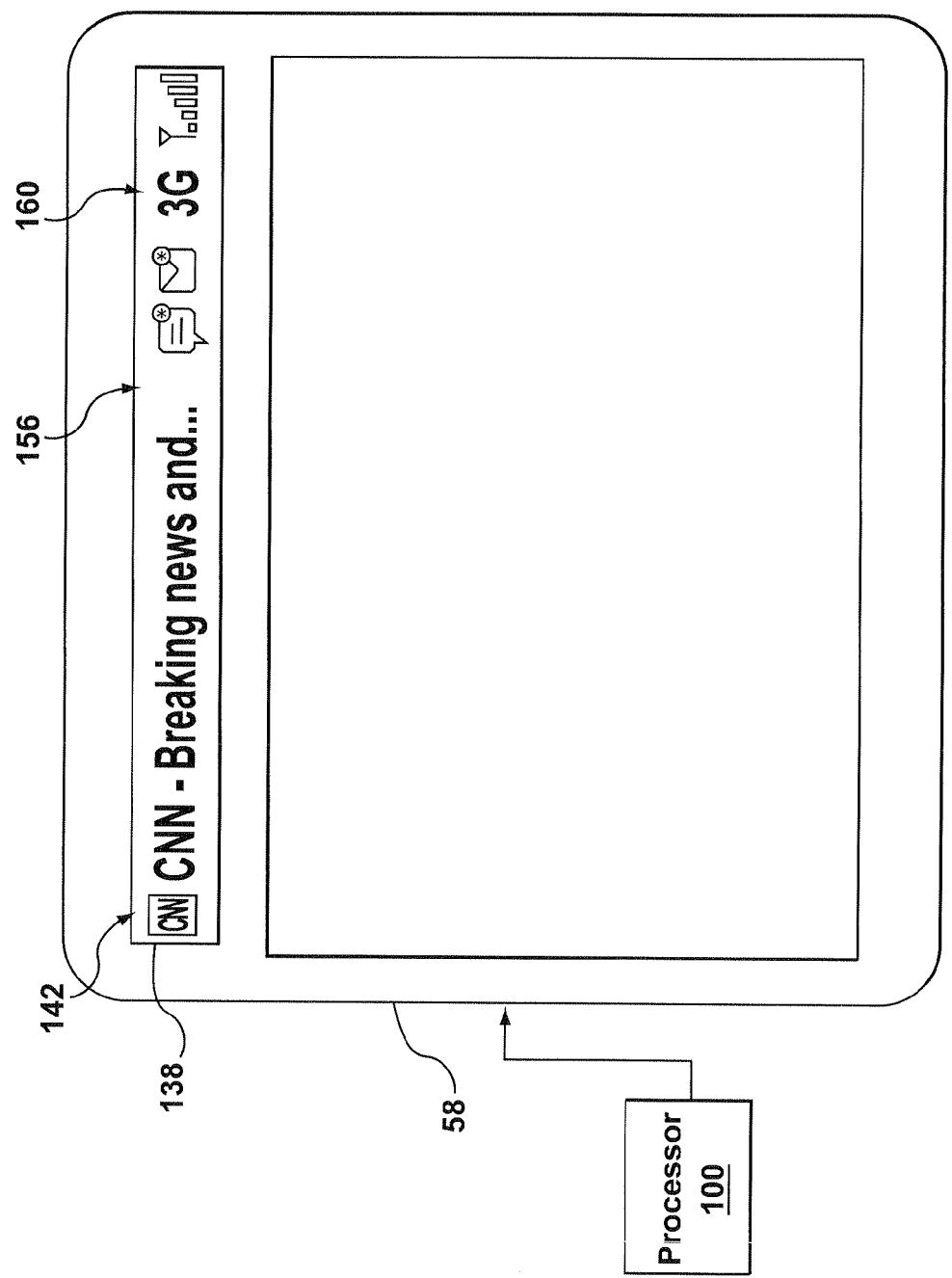
FIG. 20 shows the processor of FIG. 3 under control of the screen application of FIG. 3 for the causing display to generate a title bar for an application 136 having a long title and that has received an email notification and an instant messaging notification, wherein a minimum of two slots are available for notifications by truncating the title.

FIG. 20 shows processor 100 causing display 58 to generate title bar 138 for an application 136 having a long title and that has received an email notification and an instant messaging notification, wherein a minimum of two slots are available for notifications by truncating the title.

Figure 21:
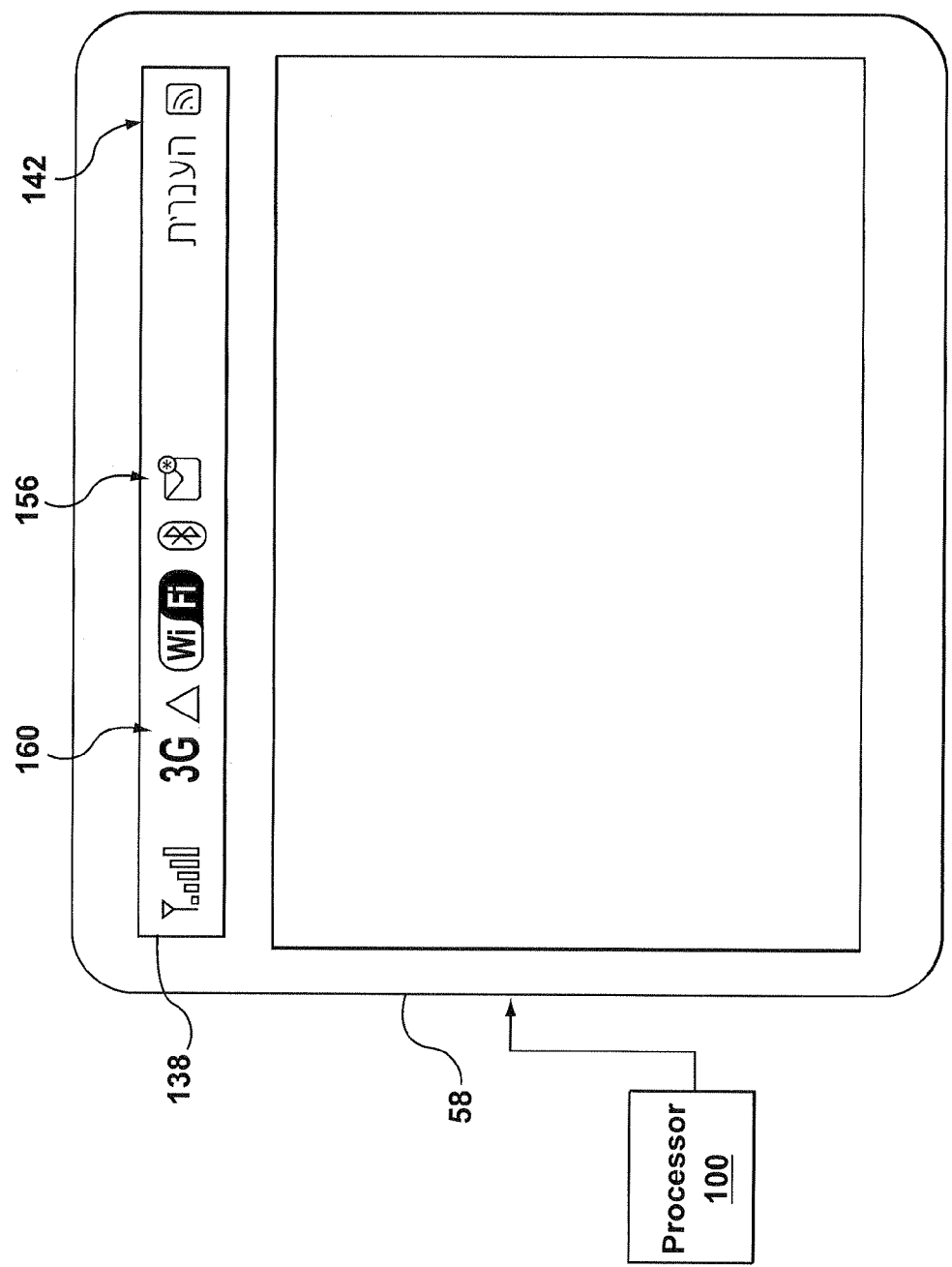
FIG. 21 shows the processor of FIG. 3 under control of the screen application of FIG. 3 for the causing display to generate a title bar for an application where the language reads from right-to-left, in which case the order of icons and information is reversed relative to FIGS. 7-20.

FIG. 21 shows processor 100 causing display 58 to generate title bar 138 for an application 136 where the language reads from right-to-left, in which case the order of icons and information is reversed relative to FIGS. 7-20.

While the foregoing provides certain non-limiting exemplary embodiments, it should be understood that combinations, subsets, and variations of the foregoing are contemplated, within the scope of the appended claims.

The invention claimed is:

1. A portable electronic device comprising:
   at least one processor;
   a display connected to said at least one processor and controllable by said at least one processor; and
   non-volatile storage configured to maintain a plurality of applications and an application programming interface that is commonly used by said plurality of applications for enabling said at least one processor to generate and control a title bar under control of said plurality of applications,
   wherein said application programming interface includes a private part for managing the state of the title bar and a public part, including a TitleBar component, that provides an interface to said plurality of applications, and
   wherein the title bar is configured to be controlled by said plurality of applications through the use of said application programming interface,
   the title bar divided into a plurality of areas including
      an information area representing current state of information relating to one of said applications, and
      an additional area representing notifications, pushed icons and signals selected for display based on requirements of said plurality of applications;
   wherein said title bar is under control of the one of said applications through said application programming interface, and
   wherein the current state information includes an application icon reflecting the current state of the one of said applications currently controlling the title bar, a title string providing a title of one of said applications currently controlling the title bar and a current time.

2. The portable device of claim 1, wherein said at least one processor causes said current state of information to be left-aligned on said display and said notifications, pushed icons and signals to be right-aligned on said display.

3. The portable device of claim 1, wherein said application programming interface includes a component for generating one of either a general title of an application or a string that provides information based on the current state of said application.

4. The portable device of claim 1, wherein said application programming interface includes an icon component for generating one of either a general application icon related to an application or an icon that reflects the current state of said application.

5. The portable device of claim 1, wherein said application programming interface includes a clock component for displaying current time.

6. The portable device of claim 1, wherein said TitleBar component is a member of a Screen component that provides a set and get functionality for adding and customizing the TitleBar component, whereby any one of said applications that requires display of said title bar extends said TitleBar component in order to avail itself of set and get functionality of said Screen component.

7. The portable device of claim 1, wherein said private part includes a TitleBarView class that implements layout for the application programming interface and drawing logic for the title bar, a TitleBarModel class for updating components and that is extended by a StandardTitleBarModel that implements data for defining the current state of the StandardTitleBar object, and a TitleBarController providing interface functionality with the TitleBarModel class and TitleBarView class.

8. The portable device of claim 7, wherein said TitleBarController listens and processes events and updates said TitleBarModel class and informs the TitleBarView class for redrawing said title bar.

9. The portable device of claim 1, wherein said TitleBar component is extended by a StandardTitleBar component that provides a public interface and provides a plurality of add/remove methods for adding optional components to the title bar.

10. The portable device of claim 9, wherein said StandardTitleBar component has at least one optional component containing a pair of functions that are prefixed with "add" and "remove", respectively.

11. The portable device of claim 9, wherein said StandardTitleBar component generates a battery icon in the event that charge on a battery of said portable device falls below a predetermined level or is being charged.

12. The portable device of claim 9, wherein said StandardTitleBar component generates an active phone call indicator in the event a call is in progress on said portable device.

13. The portable device of claim 1, wherein said TitleBar component has a first package-private method to facilitate adding components to said title bar and a second package-private method to facilitate removing components from said title bar.

14. The portable device of claim 13, wherein each of said first and second package-private method has a component Key parameter that defines which component to add to said title bar or remove therefrom.

15. A method for controlling a display of a portable device capable of executing a plurality of applications, comprising:
generating a content region on said display; and
generating a title bar on said display, the title bar configured to be controlled by said plurality of applications through the use of an application programming interface
wherein said application programming interface includes a private part for managing the state of the title bar and a public part, including a TitleBar component,
the title bar divided into a plurality of areas including
an information area representing current state of information relating to one of said applications, and
an additional area representing notifications, pushed icons, and signals selected for display based on requirements of said plurality of applications;
wherein said title bar is under control of the one of said applications through said application programming interface, and
wherein the current state information includes an application icon reflecting the current state of the one of said applications, a title string providing a title of one of said applications currently controlling the title bar and a current time.

16. The method of claim 15, wherein said information area is left aligned relative to the display, whereas said additional area is right aligned.

17. The method of claim 15, wherein said pushed icons include an active call icon.

\* \* \* \* \*